(12) United States Patent
Jeon et al.

(10) Patent No.: US 9,772,767 B2
(45) Date of Patent: Sep. 26, 2017

(54) MOBILE TERMINAL AND METHOD DISPLAYING FILE IMAGES AT THE MOBILE TERMINAL

(75) Inventors: Taeyoung Jeon, Seoul (KR); Seunghyun Woo, Seoul (KR); Jiyoung Park, Seoul (KR); Sujin Kim, Seoul (KR); Sukjin Jang, Seoul (KR); Hayang Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 391 days.

(21) Appl. No.: 13/620,453

(22) Filed: Sep. 14, 2012

(65) Prior Publication Data
US 2013/0205210 A1 Aug. 8, 2013

(30) Foreign Application Priority Data
Feb. 2, 2012 (KR) .................. 10-2012-0010802

(51) Int. Cl.
G06F 3/048 (2013.01)
G06F 3/0488 (2013.01)

(52) U.S. Cl.
CPC .......... *G06F 3/04883* (2013.01); *G06F 2203/04808* (2013.01)

(58) Field of Classification Search
CPC ....... G06F 2203/04808; G06F 3/04883; G06F 2203/04806

(Continued)

(56) References Cited

U.S. PATENT DOCUMENTS 6,501,487 B1 * 12/2002 Taguchi ............ G06F 3/0481
715/788
8,856,688 B2 * 10/2014 Tseng ............... G06F 3/0484
345/173

(Continued)

FOREIGN PATENT DOCUMENTS

| CN | 101512473 | 8/2009 |
| CN | 102171634 | 8/2011 |
| CN | 102281349 | 12/2011 |

OTHER PUBLICATIONS

ZVQLenoradxsyg, Wall of Sound app for iPad, Oct. 28, 2011, iPadHELP.com, pp. 1-6.*

(Continued)

*Primary Examiner* — Jeffrey A Gaffin
*Assistant Examiner* — Justin Lee
(74) *Attorney, Agent, or Firm* — Lee, Hong, Degerman, Kang & Waimey

(57) ABSTRACT

Disclosed are a mobile terminal and controlling method thereof. The mobile terminal is controllable in response to a pinch-in/out touch gesture. The present invention includes activating a $1^{st}$ application file via a specific application, displaying a $1^{st}$ file image corresponding to the $1^{st}$ application file on a touch screen in a single view state of displaying a single file image on the touchscreen, receiving a pinch-in touch gesture performed on the touchscreen, and switching the single view state to a multi-view state of displaying a plurality of file images in response to the reception of the pinch-in touch gesture. A $2^{nd}$ file image corresponding to each of at least one $2^{nd}$ application file and the $1^{st}$ file image are displayed on the touchscreen in the multi-view state. The $1^{st}$ application file and the at least one $2^{nd}$ application file are activated by the specific application.

30 Claims, 14 Drawing Sheets

(58) Field of Classification Search
USPC .......................................................... 715/716
See application file for complete search history.

(56) References Cited

U.S. PATENT DOCUMENTS

| | | | | |
|---|---|---|---|---|
| 8,930,841 B2* | 1/2015 | Huang | ................... | G06F 3/0482 715/700 |
| 8,930,855 B2* | 1/2015 | Yuan | ...................... | G06F 3/0482 715/765 |
| 2009/0007017 A1* | 1/2009 | Anzures | ............... | G06F 3/04883 715/835 |
| 2009/0187843 A1* | 7/2009 | Itoh | ............................... | 715/769 |
| 2010/0134425 A1 | 6/2010 | Storrusten | | |
| 2010/0283743 A1* | 11/2010 | Coddington | .......... | G06F 3/0485 345/173 |
| 2010/0313164 A1* | 12/2010 | Louch | .................... | G06F 3/0481 715/790 |
| 2011/0074828 A1* | 3/2011 | Capela | .................. | G06F 3/0481 345/661 |
| 2011/0078622 A1* | 3/2011 | Missig | .................. | G06F 3/0486 715/784 |
| 2011/0078624 A1* | 3/2011 | Missig | ................ | G06F 3/04883 715/802 |
| 2011/0179387 A1* | 7/2011 | Shaffer | ............... | G06F 3/04883 715/835 |
| 2011/0209100 A1* | 8/2011 | Hinckley | ............ | G06F 3/04883 715/863 |
| 2011/0283188 A1 | 11/2011 | Farrenkopf et al. | | |
| 2012/0064946 A1* | 3/2012 | Voetberg | ............ | H04N 1/00411 455/566 |
| 2012/0192110 A1* | 7/2012 | Wu | ...................... | G06F 3/04883 715/815 |
| 2013/0047119 A1* | 2/2013 | Lee | ...................... | G06F 3/04883 715/800 |
| 2014/0189855 A1* | 7/2014 | Moradi | ................... | G06F 21/36 726/19 |

OTHER PUBLICATIONS

Keyur Sorathia, Touch Screen Gestures, before Feb. 2, 2012, D'source, pp. 1-15.*
Zollotech, iPad-In-Dephth, Apr. 5, 2010, Youtube, pp. 1-7.*
Pixite, Getting Started, Before Feb. 2, 2012, Flickring, pp. 1-2.*
GSMArena team, "HTC Sensation review: Front-page stuff," XP055110932, Jun. 2011, 59 pages.
European Patent Office Application Serial No. 12006318.5, Search Report dated Apr. 7, 2014, 10 pages.
European Patent Office Application Serial No. 12006318.5, Office Action dated Apr. 13, 2017, 12 pages.
Wroblewski, L., "Touch Gesture Reference Guide," LukeW Ideation + Design, XP055355054, Mar. 2017, 11 pages.

* cited by examiner

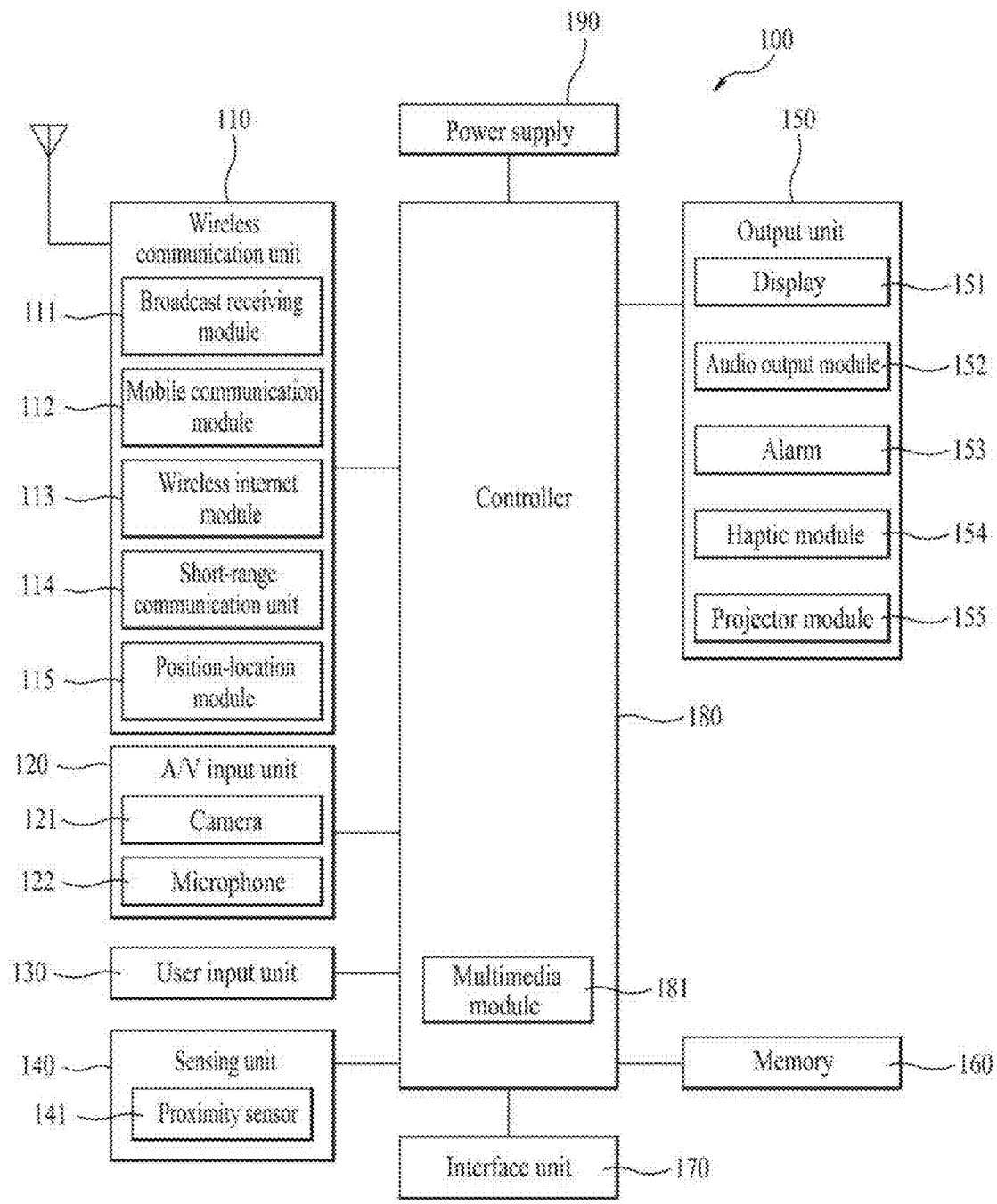

MOBILE TERMINAL AND METHOD DISPLAYING FILE IMAGES AT THE MOBILE TERMINAL

Pursuant to 35 U.S.C. §119(a), this application claims the benefit of earlier filing date and right of priority to Korean Application No. 10-2012-0010802, filed on Feb. 2, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for controlling a function of the mobile terminal in response to a pinch-in or pinch-out touch gesture.

Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural part and/or software part of the terminal.

Regarding the ongoing trend of a touchscreen display region in a terminal, a recent terminal tends to be equipped with a touchscreen having a display region wider or larger than that of a related art terminal. Owing to the wider or larger display region, application icons or application files are displayable as many as possible. And, a desired application can be selected and activated via a touchscreen.

However, after applications for various functions have been installed in a terminal, when icons of the installed applications are displayed on a touchscreen of the terminal, the necessity for an efficient method for a user to select and activate a plurality of application icons via a touchscreen is increasingly growing. Under the necessity for the efficient method, the demand for a user-friendly mobile terminal controlling method for efficiently controlling icons or files on a touchscreen and activating applications is rising.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which a display region of an image or icons displayed on a display unit can be efficiently enlarged or reduced in response to a provided touch gesture of a user.

Another object of the present invention is to provide a mobile terminal and controlling method thereof, by which an icon and an application related to the corresponding icon can be activated and displayed using a user's multi-touch gesture.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling a mobile terminal according to one embodiment of the present invention may include the steps of activating a $1^{st}$ application file via a specific application, displaying a $1^{st}$ file image corresponding to the $1^{st}$ application file on a touch screen in a single view state of displaying a single file image on the touchscreen, receiving a pinch-in touch gesture performed on the touchscreen, and switching the single view state to a multi-view state of displaying a plurality of file images in response to the reception of the pinch-in touch gesture, wherein a $2^{nd}$ file image corresponding to each of at least one $2^{nd}$ application file and the $1^{st}$ file image are displayed on the touchscreen in the multi-view state and wherein the $1^{st}$ application file and the at least one $2^{nd}$ application file are activated by the specific application.

Preferably, the pinch-in touch gesture may include a touch drag gesture performed in a manner of touching two touch points on the touchscreen and then decreasing a relative distance between the two touch points.

More preferably, the method may further include the step of decreasing a size of the $1^{st}$ file image in response to the decreased relative distance between the two touch points touched by the pinch-in touch gesture.

Preferably, the method may further include the steps of if the single view state is switched to the multi-view state, receiving a touch gesture of selecting a specific $2^{nd}$ file image among the at least one $2^{nd}$ file image displayed on the touchscreen, activating a specific $2^{nd}$ application file corresponding to the selected specific $2^{nd}$ file image among the at least one $2^{nd}$ application file, and displaying the selected specific $2^{nd}$ file image on the touchscreen by switching to the single view state.

Preferably, if the single view state is switched to the multi-view state, the $1^{st}$ file image may be displayed in a manner of including an information indicating an active state of the $1^{st}$ application file right before switching to the multi-view state.

Preferably, the specific application may include at least one of a music play application, an internet application, a word processor application and an image editing application.

More preferably, if the specific application include the music play application, each of the $1^{st}$ application file and the at least one $2^{nd}$ application file may include a music file activated by the music play application and each of the $1^{st}$ file image and the at least one $2^{nd}$ file image may represent an album image including a corresponding application file.

More preferably, if the specific application includes either the word processor application or the image editing application, each of the $1^{st}$ file image and the at least one $2^{nd}$ file image in the multi-view state may include an indication indicating whether a corresponding application file is saved.

Preferably, the method may further include the step of ending an operation of the specific application if the pinch-in touch gesture continues after switching to the multi-view state.

Preferably, the method may further include the step of if the pinch-in touch gesture continues after switching to the multi-view state, switching to a list view state of displaying a file list including the $1^{st}$ application file and the at least one $2^{nd}$ application file.

Preferably, the method may further include the step of if the pinch-in touch gesture continues after switching to the multi-view state, enabling the $1^{st}$ file image and the at least one $2^{nd}$ file image to represent summary informations for summarizing the application files corresponding to the $1^{st}$ file image and the at least one $2^{nd}$ file image, respectively.

Preferably, the method may further include the steps of analyzing an operating status of the $1^{st}$ application file right before switching to the multi-view state and saving the $1^{st}$ application file in the analyzed operating status in accordance with a result of the analyzing step.

In another aspect of the present invention, a mobile terminal according to another embodiment of the present invention may include a touchscreen configured to display a $1^{st}$ file image corresponding to a $1^{st}$ application file active via a specific application in a single view state of displaying a single file image, the touchscreen configured to receive a pinch-in touch gesture and a controller controlling the single view state to be switched to a multi-view state of displaying a plurality of file images in response to the reception of the pinch-in touch gesture, wherein a $2^{nd}$ file image corresponding to each of at least one $2^{nd}$ application file and the $1^{st}$ file image are displayed on the touchscreen in the multi-view state and wherein the $1^{st}$ application file and the at least one $2^{nd}$ application file are activated by the specific application.

Preferably, the pinch-in touch gesture may include a touch drag gesture performed in a manner of touching two touch points on the touchscreen and then decreasing a relative distance between the two touch points.

More preferably, the controller may control the touchscreen to display the $1^{st}$ file image in a manner of decreasing a size of the $1^{st}$ file image in response to the decreased relative distance between the two touch points touched by the pinch-in touch gesture.

Preferably, if the single view state is switched to the multi-view state, the touchscreen may receive a touch gesture of selecting a specific $2^{nd}$ file image among the at least one $2^{nd}$ file image displayed on the touchscreen, the controller may activate a specific $2^{nd}$ application file corresponding to the selected specific $2^{nd}$ file image among the at least one $2^{nd}$ application file, and the controller may control the touchscreen to display the selected specific $2^{nd}$ file image on the touchscreen by switching to the single view state.

Preferably, if the single view state is switched to the multi-view state, the touchscreen may display the $1^{st}$ file image in a manner that the displayed $1^{st}$ file image includes an information indicating an active state of the $1^{st}$ application file right before switching to the multi-view state.

Preferably, the specific application may include at least one of a music play application, an internet application, a word processor application and an image editing application.

More preferably, if the specific application comprises the music play application, each of the $1^{st}$ application file and the at least one $2^{nd}$ application file may include a music file activated by the music play application. And, each of the $1^{st}$ file image and the at least one $2^{nd}$ file image may represent an album image including a corresponding application file.

More preferably, if the specific application comprises either the word processor application or the image editing application, the touchscreen may display each of the $1^{st}$ file image and the at least one $2^{nd}$ file image in the multi-view state in a manner that each of the $1^{st}$ file image and the at least one $2^{nd}$ file image represents an indication indicating whether a corresponding application file is saved.

Preferably, the controller may control an operation of the specific application to be ended if determining that the pinch-in touch gesture continues after switching to the multi-view state.

Preferably, if the pinch-in touch gesture continues after switching to the multi-view state, the controller may switch to a list view state of displaying a file list including the $1^{st}$ application file and the at least one $2^{nd}$ application file.

Preferably, if the pinch-in touch gesture continues after switching to the multi-view state, the controller may control the touchscreen to enable the $1^{st}$ file image and the at least one $2^{nd}$ file image to represent summary informations for summarizing the application files corresponding to the $1^{st}$ file image and the at least one $2^{nd}$ file image, respectively.

Preferably, the controller may analyze an operating status of the $1^{st}$ application file right before switching to the multi-view state and the mobile terminal may further include a memory configured to store the $1^{st}$ application file in the analyzed operating status in accordance with a result of the analyzing step.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 1 is a block diagram of a mobile terminal according to one embodiment of the present invention;

DETAILED DESCRIPTION OF THE INVENTION

Figure 2A:
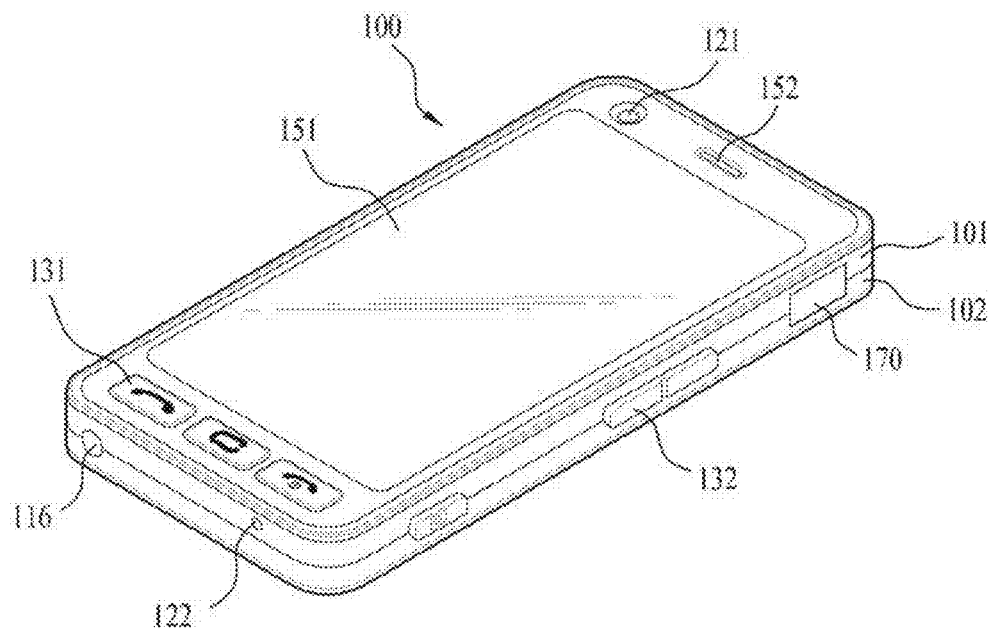
FIG. 2A is a front perspective diagram of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
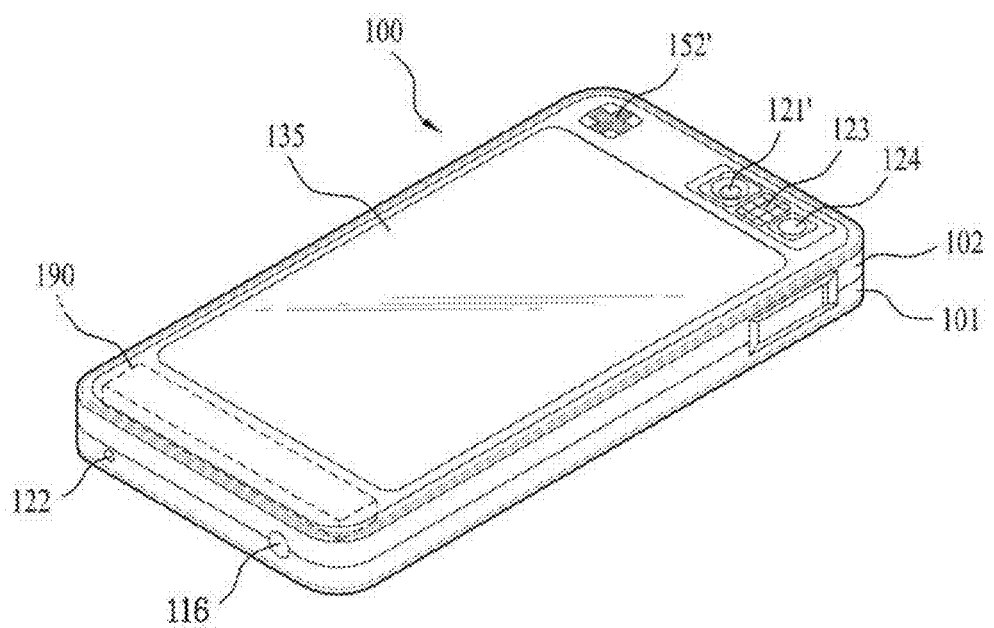
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Interconnected operational mechanism between the display unit 151 and the touchpad 135 are explained with reference to FIG. 3A and FIG. 3B as follows.

Figure 3A:
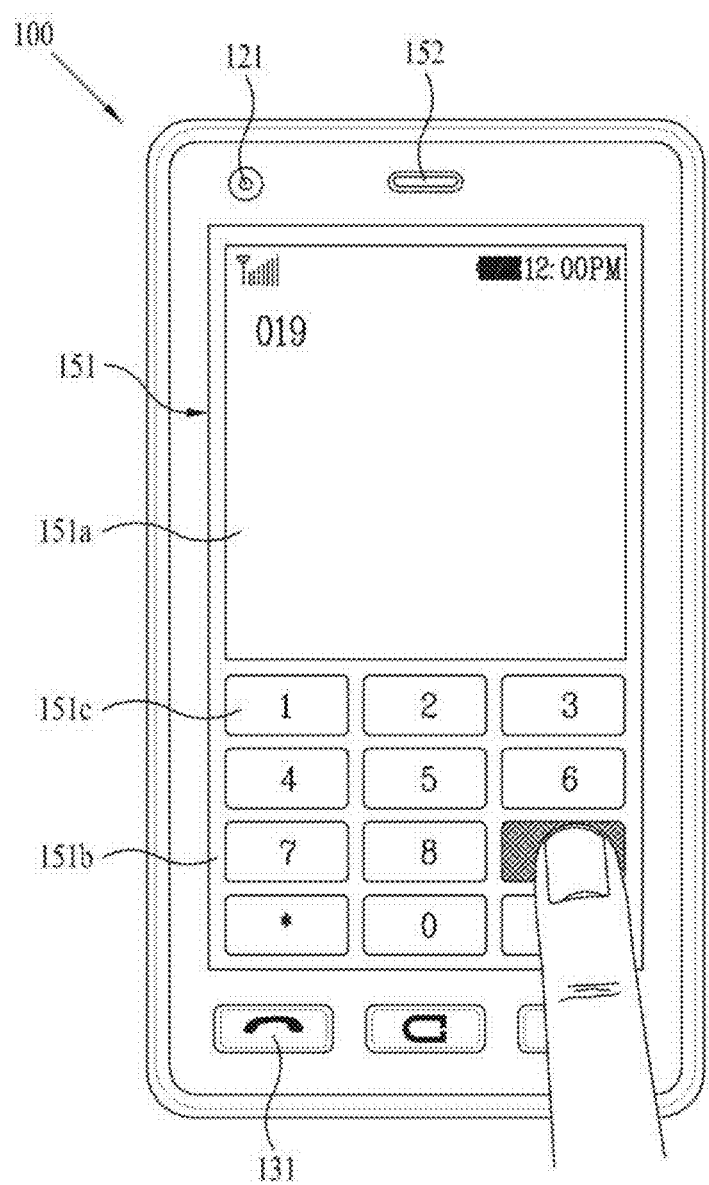
FIG. 3A and FIG. 3B are front diagrams of a mobile terminal according to one embodiment of the present invention for explaining one operational status of the mobile terminal, respectively.
Figure 3B:
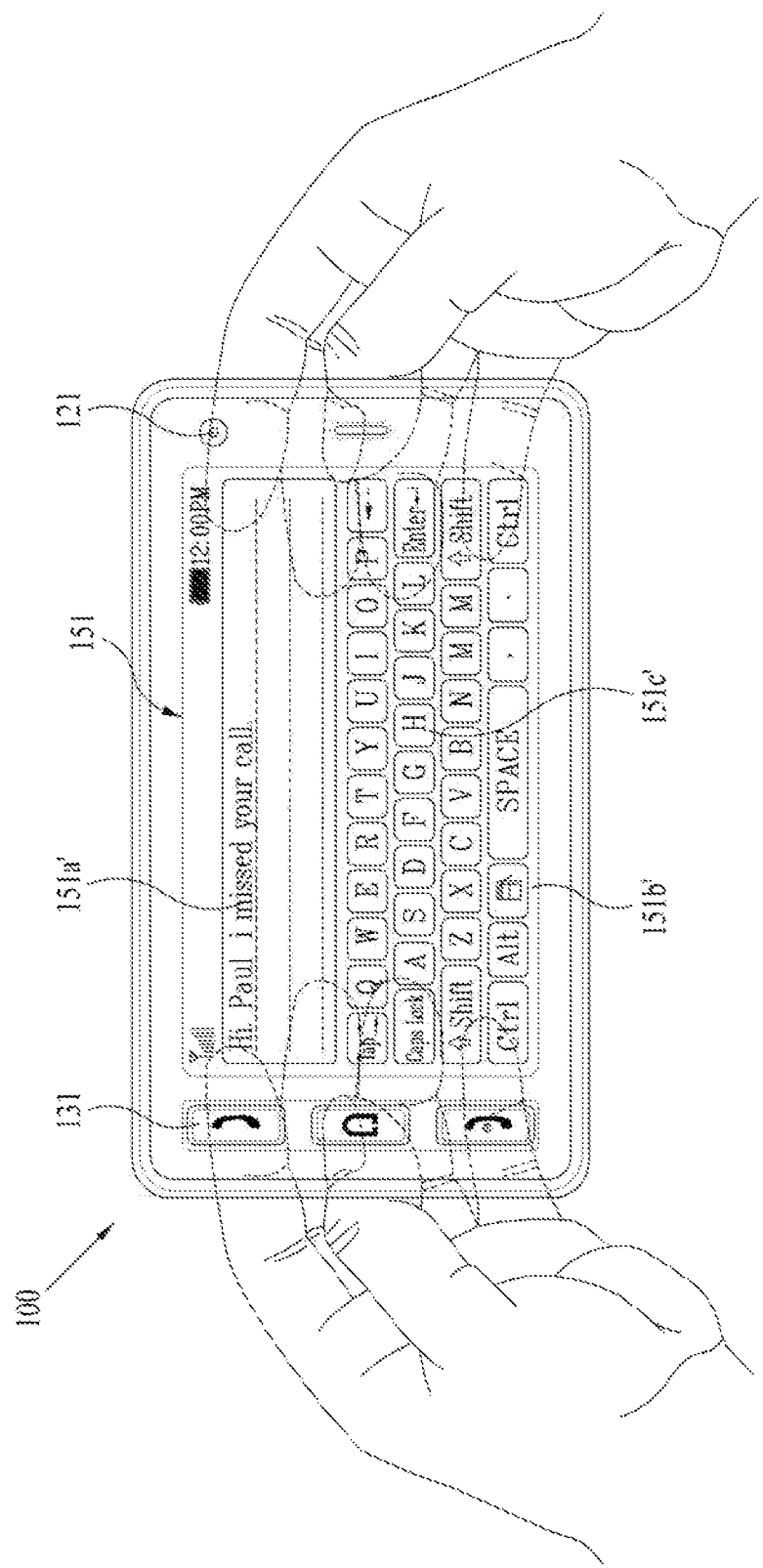

FIG. 3A and FIG. 3B are front-view diagrams of a terminal according to one embodiment of the present invention for explaining an operational state thereof.

First of all, various kinds of visual information can be displayed on the display unit 151. And, these information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3A shows that a touch applied to a soft key is inputted through a front face of a terminal body.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c representing a digit for inputting a phone number or the like is outputted to the input window 151b. If the soft key 151c is touched, a digit corresponding to the touched soft key is outputted to the output window 151a. If the first manipulating unit 131 is manipulated, a call connection for the phone number displayed on the output window 151a is attempted.

FIG. 3B shows that a touch applied to a soft key is inputted through a rear face of a terminal body. If FIG. 3A shows a case that the terminal body is vertically arranged (portrait), FIG. 3B shows a case that the terminal body is horizontally arranged (landscape). And, the display unit 151 can be configured to change an output picture according to the arranged direction of the terminal body.

FIG. 3B shows that a text input mode is activated in the terminal.

An output window 151a' and an input window 151b' are displayed on the display unit 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display unit 151. In case that the display unit 151 and the touchpad 135 are configured transparent, it is able to visually check fingers located at the backside of the terminal body. Hence, more correct touch inputs are possible.

Besides, the display unit 151 or the touchpad 135 can be configured to receive a touch input by scroll. A user scrolls the display unit 151 or the touchpad 135 to shift a cursor or pointer located at an entity (e.g., icon or the like) displayed on the display unit 151. Furthermore, in case that a finger is shifted on the display unit 151 or the touchpad 135, a path of the shifted finger can be visually displayed on the display unit 151. This may be useful in editing an image displayed on the display unit 151.

To cope with a case that both of the display unit (touchscreen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display unit 151 or the touchpad 135.

Figure 4:
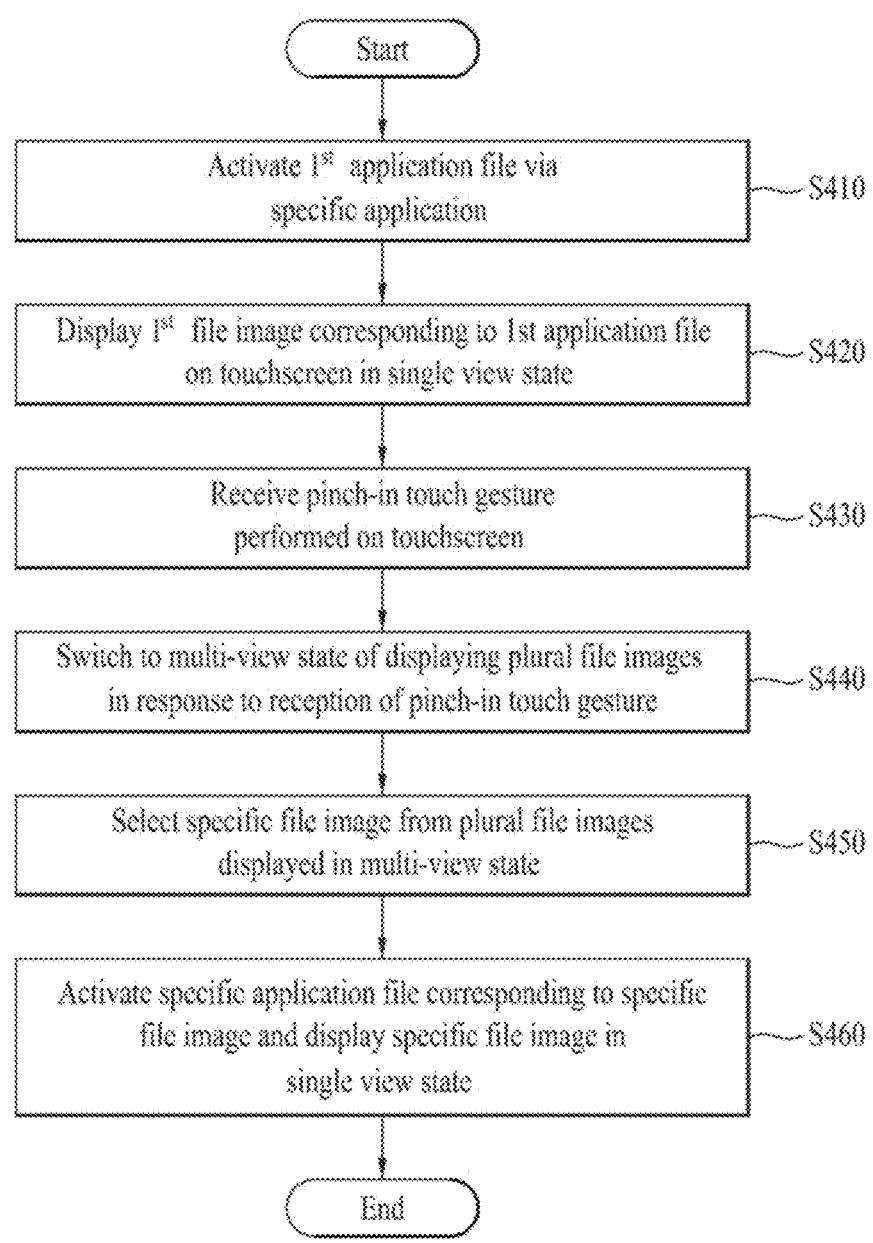
FIG. 4 is a flowchart for a method of controlling a mobile terminal according to the present invention.

FIG. 4 is a flowchart for a method of controlling a mobile terminal according to the present invention.

Referring to FIG. 4, the controller 180 activates a $1^{st}$ application file via a specific application [S410]. In this case, application files including the $1^{st}$ application file may mean files that can be activated via the specific application. The touchscreen 151 may display a $1^{st}$ file image corresponding to the $1^{st}$ application file in a single view state [S420]. Subsequently, the touchscreen 151 may receive a pinch-in touch gesture from a user in the single view state [S430]. In response to the reception of the pinch-in touch gesture, the controller 180 may be able to enter a multi-view state for displaying a plurality of file images [S440].

After the step S440, a specific file image is selected from the plurality of file images and may then switch to the single view state. In particular, the touchscreen 151 may receive a selection of a specific file image selected from a plurality of file images displayed in the multi-view state [S450]. Subsequently, the controller 180 activates a specific application file corresponding to the selected specific file image and may then control the specific file image to be displayed in the single view state [S460].

Meanwhile, the terminology called 'single view state' mentioned in the specification may mean a state in which a single image is displayed on the touchscreen 151. For example, when a music A file is played via a music play application, if a single view state is entered, a music A image (album A image) related to the music A file may be displayed on the touchscreen 151. On the other hand, the terminology called 'multi-view state' mentioned in this specification is conceptionally opposite to the single view state and may mean a state in which a plurality of images are displayed on the touchscreen 151. For instance, when a music play application is activated in the same manner of the above example, if a multi-view state is entered, a plurality of images including a music A image (album A image) related to a music A file, a music B image (album B image) related to a music B file, and a music C image (album C image) related to a music C file, and the like may be displayed on the touchscreen 151 together.

According to the present invention, various control operations may be activated in the mobile terminal 100 in response to a pinch-in touch gesture or a pinch-out touch gesture. In the following description, the pinch-in touch gesture and the pinch-out touch gesture are explained.

First of all, the pinch-in/out touch gesture may basically mean a touch gesture performed in a manner of touching two touch points on the touchscreen 151 and then increasing or decreasing a relative distance between the two touch points. In doing so, the touch gesture of decreasing or increasing the relative distance between the two touch points may include a flicking touch gesture performed in a manner of flicking a finger or a drag touch gesture performed in a manner of pulling or pushing the touch points.

Although the terminology 'pinch in/out' is usable to represent the corresponding touch gesture as a pinching action. The present invention may be non-limited by such a pinch action as the pinch-in/out action. And, all kinds of touch gestures of increasing or decreasing a relative distance between two touched points may be applicable to the present invention.

If the controller 180 receives the pinch-in/out touch gesture, the controller 180 may be able to perform a control operation corresponding to the received pinch-in/out touch gesture. In accordance with the meaning indicated by the two touch points by the pinch-in/out touch gesture, a different control operation may be performed. For instance, in case that two touch points by a pinch-in/out touch gesture belong to a specific icon displayed on the touchscreen 151, a target of a control operation by the pinch-in/out touch gesture may include the specific icon. Optionally, a control operation can be performed irrespective of locations of touch points. For instance, in response to a pinch-in/out touch gesture performed by a user in a manner of touching two random points on the touchscreen 151, it may be able to control a whole image displayed on the touchscreen 151 to be reduced/enlarged.

Figure 9:
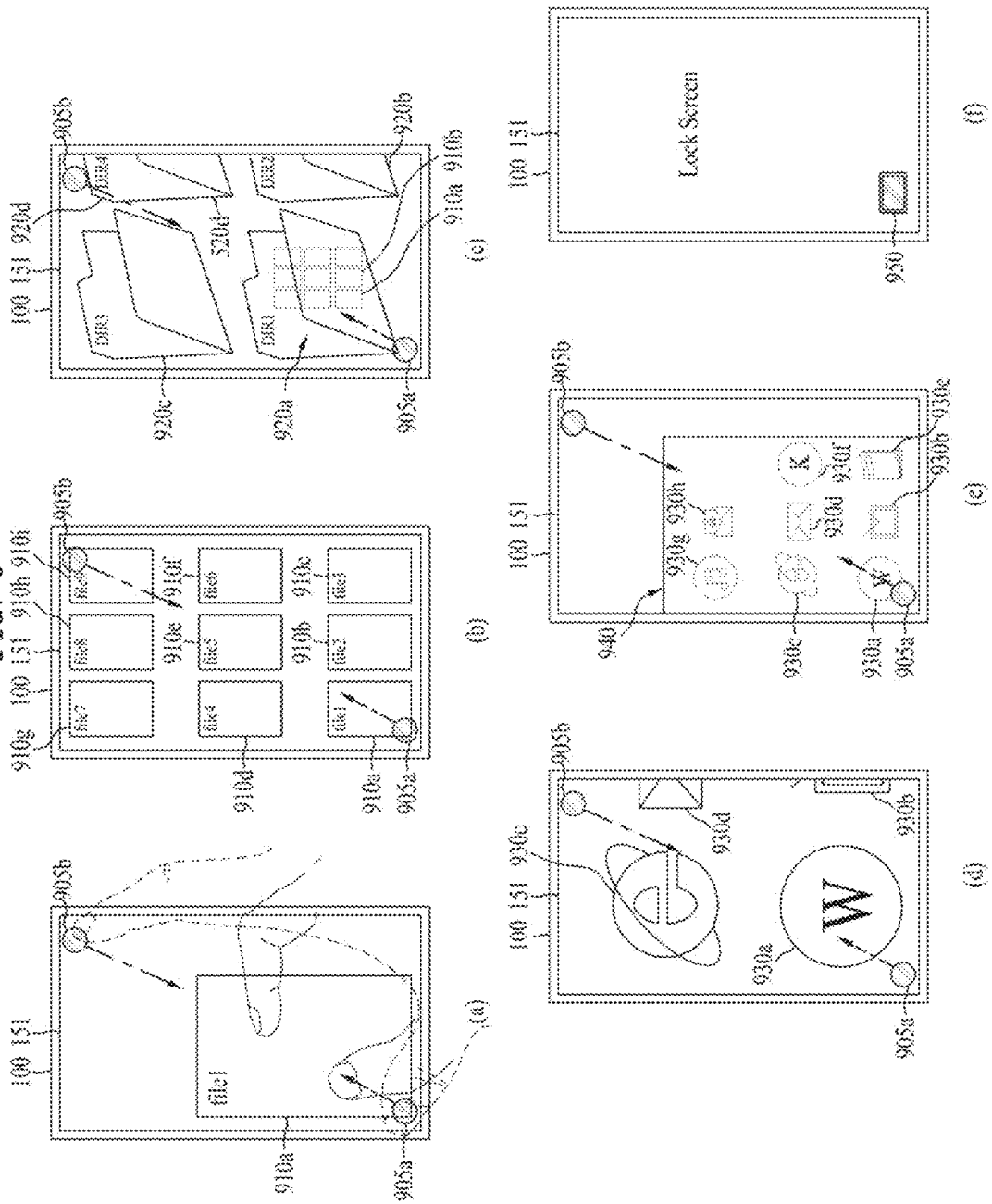
FIG. 9 is a diagram for an operation of changing a hierarchical structure of images displayed in response to user's continuous pinch-in touch gesture on a home screen image according to the present invention.
Figure 10:
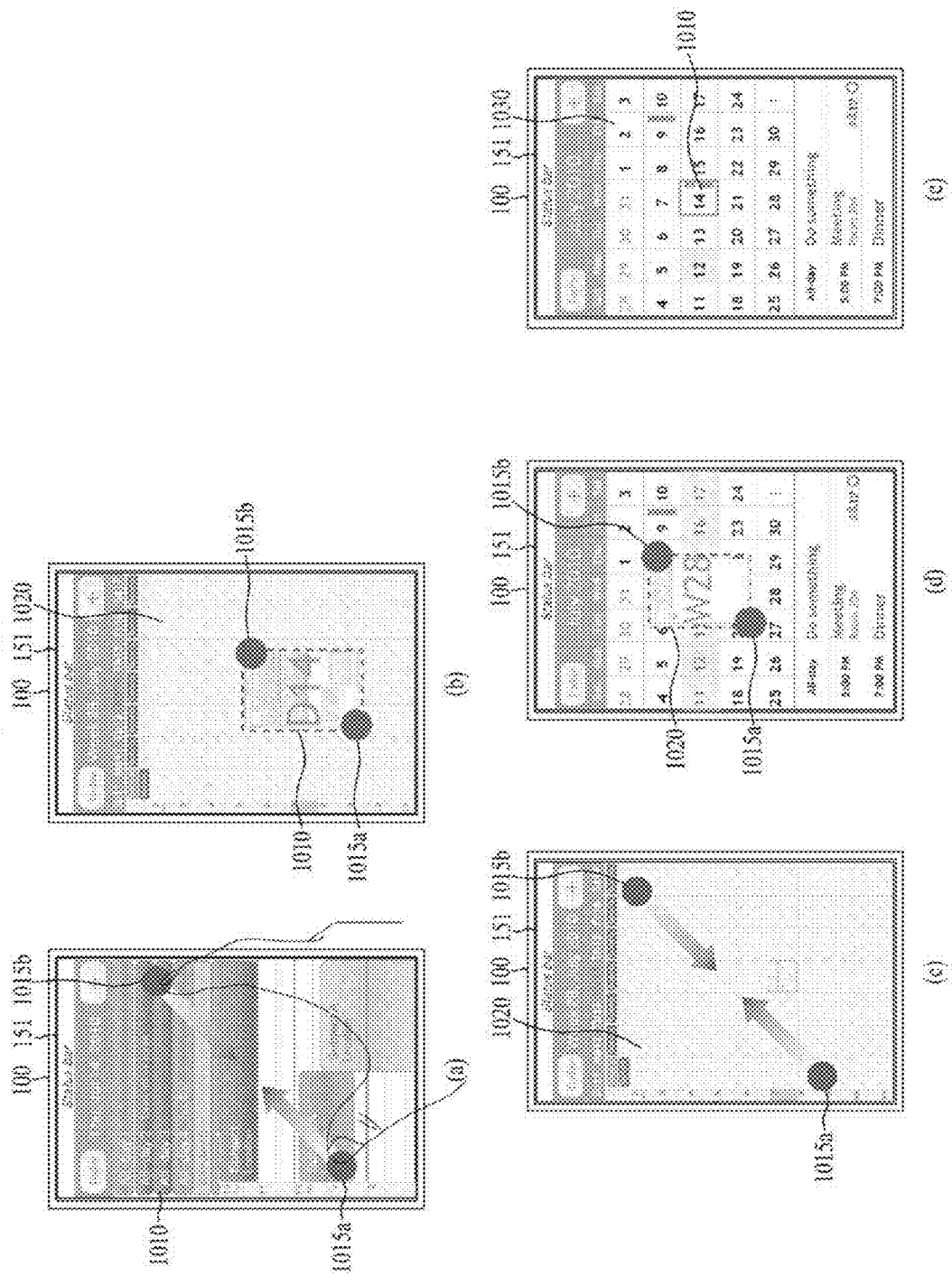
FIG. 10 is a diagram for an operation of changing a hierarchical structure of a display image in response to user's continuous pinch-in touch gesture on a calendar display screen according to the present invention.
Figure 11:
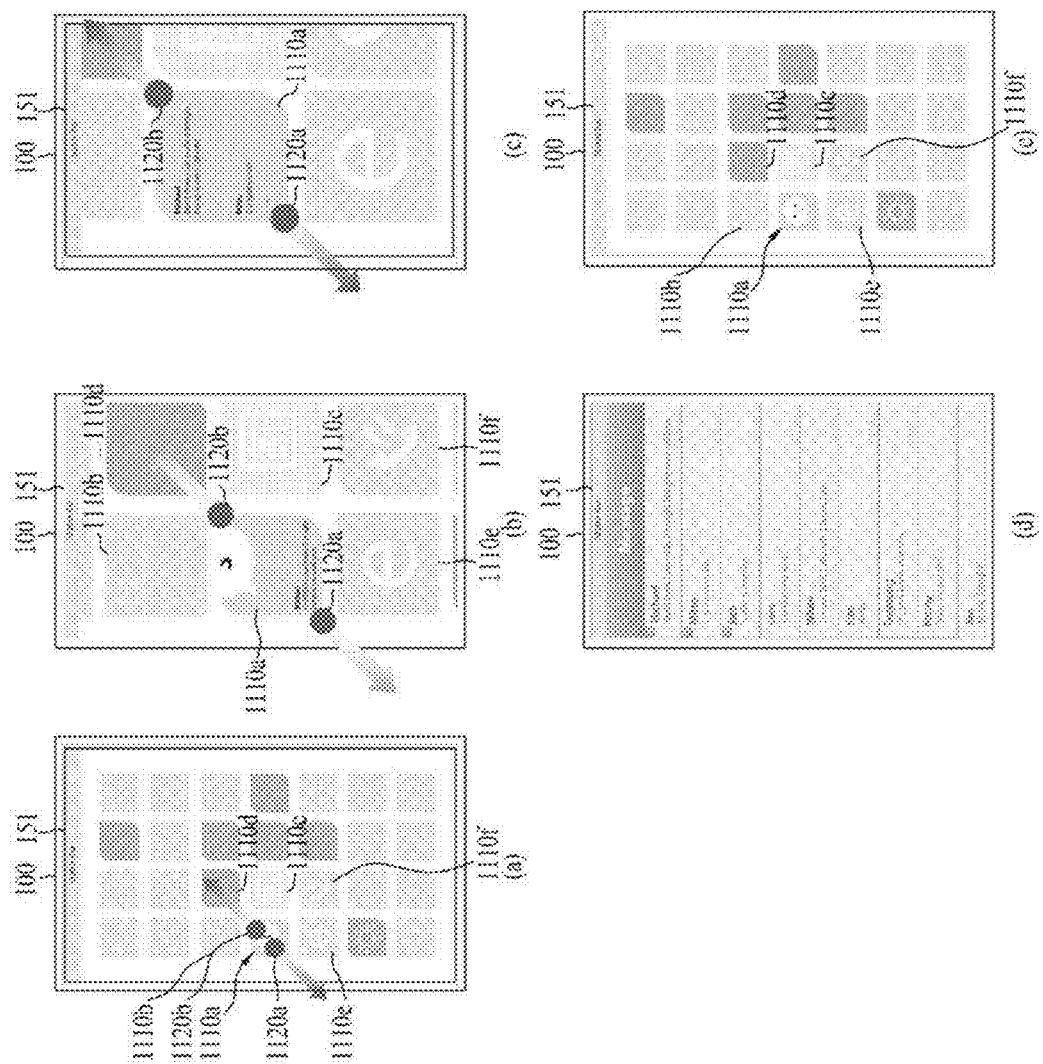
FIG. 11 is a diagram for one example of an operation of changing information displayed on an icon displayed on a home screen image in response to a pinch-out touch gesture according to the present invention.
Figure 12:
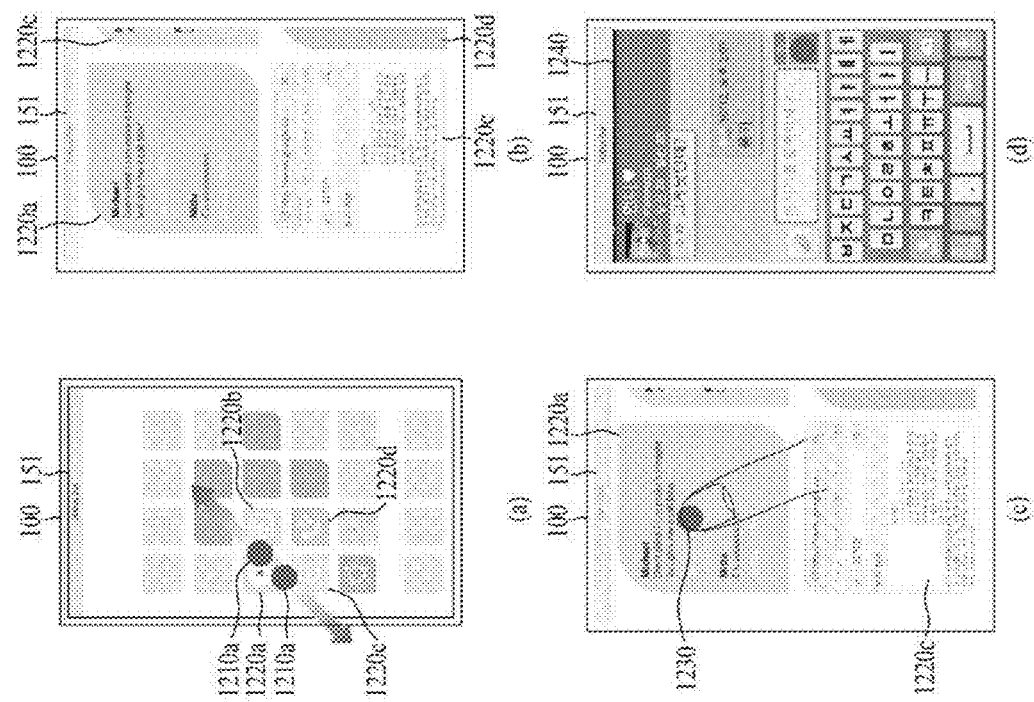
FIG. 12 is a diagram for another example of an operation of changing information displayed on an icon displayed on a home screen image in response to a pinch-out touch gesture according to the present invention.

According to the present invention, there may exist various kinds of control operations by pinch-in/out touch gestures. With reference to FIGS. 5 to 8, an operation of switching to a multi-view state in the course of activating an application is described as one example of the control operation by the pinch-in/out touch gesture. With reference to FIG. 9 and FIG. 10, an operation of changing a hierarchical structure of images (icons or file images) is described as another example of the control operation by the pinch-in/out touch gesture. With reference to FIG. 11 and FIG. 12, an operation of changing information displayed on an icon displayed on a home screen or activating an application corresponding to an icon is described as a further example of the control information by the pinch-in/out touch gesture.

In the following description, embodiments according to the follow of the mobile terminal controlling method described with reference to FIG. 4 are explained with reference to FIGS. 5 to 8.

FIGS. 5 to 8 show examples of a control operation by a pinch-in/out touch gesture, in which control operations of switching a single view state to a multi-view state by a pinch in touch gesture in the course of activating a specific application are shown.

Figure 5:
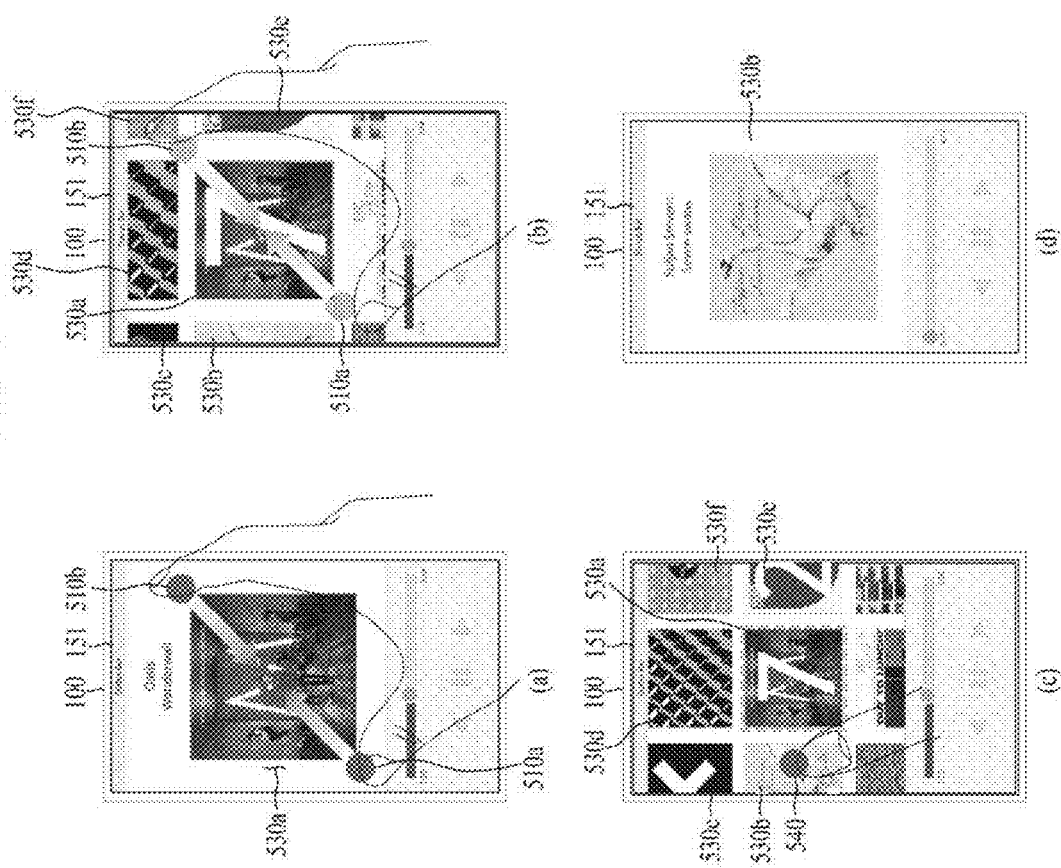
FIG. 5 is a diagram for one example of a multi-view state switching operation in association with a music application in response to a pinch-in touch gesture according to the present invention.

FIG. 5 is a diagram for one example of a multi-view state switching operation in association with a music application in response to a pinch-in touch gesture according to the present invention.

Referring to FIG. 5 (a), while the controller 180 activates a music application for playing a specific music file, the touchscreen 151 may display a music image related to the active specific music file. Referring to the drawing, a $1^{st}$ album image 530a related to an album having the specific music file belong thereto is being displayed on the touchscreen 151. In doing so, the $1^{st}$ album image 530a is displayed in a single view state on the touchscreen 151. If a pinch-in touch gesture for decreasing a relative distance between two touch points 510a and 510b is received from a user via the touchscreen 151, the controller 180 may recognize the received pinch-in touch gesture as a user command for switching to a multi-view state.

Hence, the controller 180 may be able to switch to the multi-view state for displaying the $1^{st}$ album image 530a of the currently active specific music file and other album images on the touchscreen 151.

Referring to FIG. 5 (b), in response to the pinch-in touch gesture, a plurality of the album images 530a to 530f including the $1^{st}$ album image 530a related to the currently active specific music file may be displayed on the touchscreen 151 in the multi-view state.

In doing so, if the user continues the pinch-in touch gesture for decreasing the relative distance between the two touch points 510a and 510b, it may be able to reduce a plurality of the album images in the multi-view state. Optionally, if the user continues the pinch-in touch gesture, it may be able to reduce the $1^{st}$ album image 530a related to the active music file only among a plurality of the album images in the multi-view state.

Meanwhile, if the single view state is switched to the multi-view state, an active status of the corresponding specific music file may be displayed on the album image. For instance, referring to FIG. 5 (b), if the single view state of displaying the $1^{st}$ album image 530a only is switched to the multi-view state in response to the pinch-in touch gesture, the $1^{st}$ album image 530a in the multi-view state may represent an active status (e.g., information on a track number in the album) of the corresponding specific music file at the timing point of the pinch-in touch gesture. In the drawing, the $1^{st}$ album image 530a represents '7' as the information on the track number in the album. Moreover, after an active status of a specific music file, which was active right before initiation of a pinch-in touch gesture, has been exactly analyzed, the specific music file of the active status can be saved in the memory 160. Hence, if the corresponding specific music file is selected again, it may be able to resume the specific music file in continuation with the previously active point.

Referring to FIG. 5(c), a plurality of the album images 530a to 530e in the multi-view state are reduced in response to the pinch-in touch gesture. While the pinch-in touch gesture is continuing, the album images in the multi-view state are reduced, whereby more album images may be displayed on the touchscreen 151.

Meanwhile, since a plurality of the album images 530a to 530e are displayed in the multi-view state, in order to discriminate the music file activated right before the initiation of the pinch-in touch gesture and the $1^{st}$ album image 530a related to the corresponding music file from the rest of the album images 530b to 530e, an outline of the $1^{st}$ album image 530a may be highlighted or shaded.

Referring to FIG. 5 (c), a touch gesture 540 is performed to select a specific album image 530b from a plurality of album images 530a to 530e displayed on the touchscreen 151.

Referring to FIG. 5 (d), in response to the selection of the specific album image 530b, the controller 180 may be able to activate a specific music file related to the specific album image 530b. Moreover, the controller 180 switches to the single view state to control the touchscreen 151 to display the specific album image 530b only. Moreover, when the specific music file is activated, the controller 180 may control the specific music file saved in the memory 160 to be played in a manner of starting with a most recently played portion of the specific music file.

Meanwhile, when the pinch-in touch gesture is continuing in the multi-view state, the controller 180 may control the corresponding music application to be ended.

Figure 6:
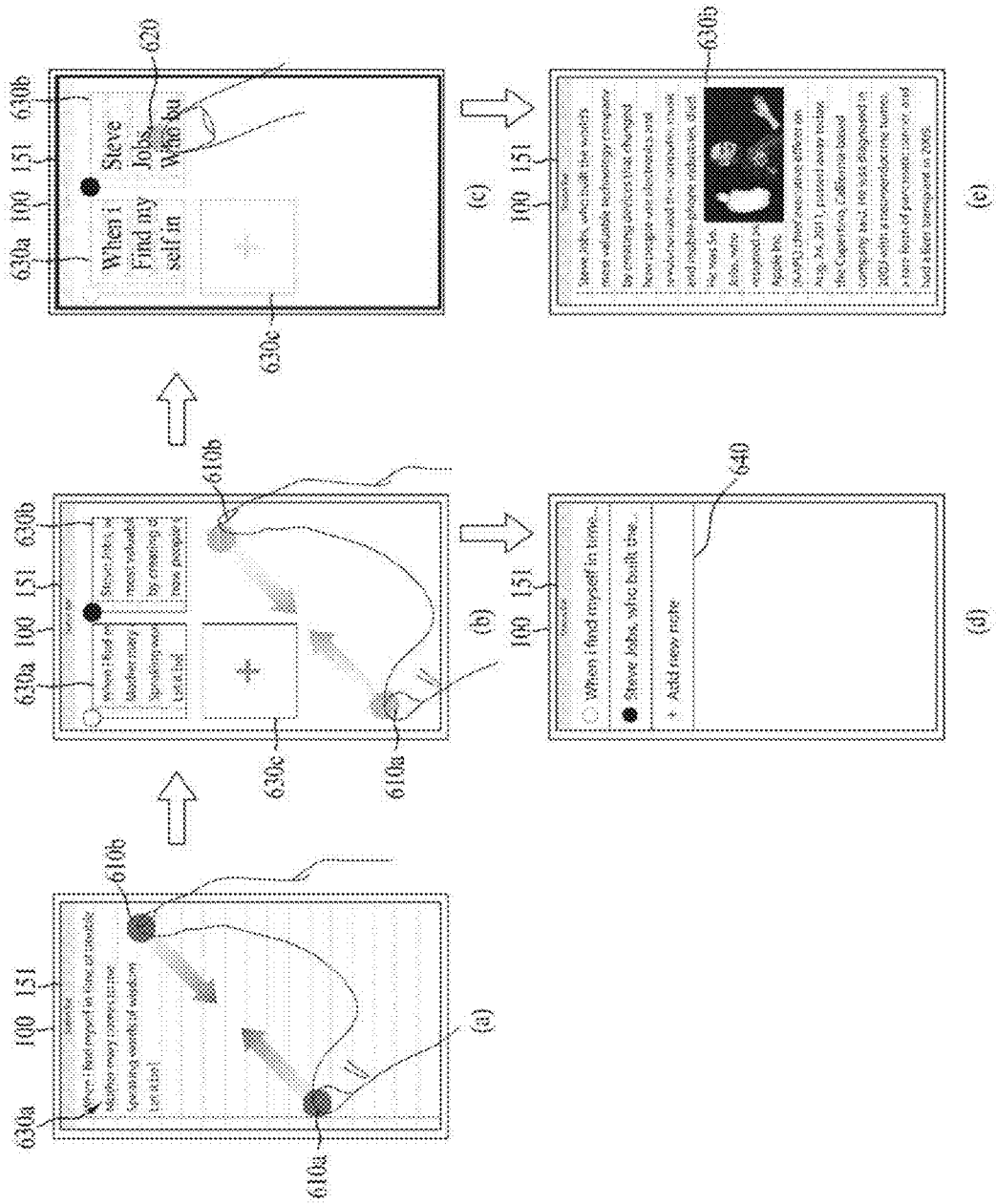
FIG. 6 is a diagram for one example of a multi-view state switching operation in association with a word processor application in response to a pinch-in touch gesture according to the present invention.

FIG. 6 is a diagram for one example of a multi-view state switching operation in association with a word processor application in response to a pinch-in touch gesture according to the present invention.

Referring to FIG. 6 (a), a specific word file is created by activating a word processor application. As a state of creating a specific word file, the touchscreen 151 may display a $1^{st}$ word file image 630a in a single view state. In doing so, the $1^{st}$ word file image 630 may represent a state in which an ongoing word file currently created by a user keeps changing bit by bit. In particular, the word file image is the image that represents a word file activated by the word processor application.

In doing so, if a pinch-in touch gesture is performed to decrease a relative distance between two touch points 610a and 610b, the controller 180 may switch to a multi-view state in which several word file images are displayable for the word processor application.

Referring to FIG. 6 (b), in response to the pinch-in touch gesture, a plurality of file images 630a and 630b are displayed on the touchscreen 151. A creation window for creating a new word file or a $3^{rd}$ word file image 630c may be displayed on the touchscreen 151 as well as the $1^{st}$ word file image 630a related to the previously created word file shown in FIG. 6 (a) and the $2^{nd}$ word file image 630b related to another word file.

Referring to FIG. 6 (b), each of a plurality of the word file images 630a and 630b may be able to represent whether the word file related to the corresponding word file image has been saved. In the drawing, the $1^{st}$ word file image 630a uses the indication 'o' to indicate that the related word file has not been saved, while the $2^{nd}$ word file image 630b uses the indication '•' to indicate that the related word file has been saved.

Another pinch-in touch gesture is shown in FIG. 6 (b). If the pinch-in touch gesture is performed once more in the multi-view state shown in FIG. 6 (b) or is continuing, the state shown in FIG. 6 (c), or optionally, the state shown in FIG. 6 (d) may be entered.

First of all, FIG. 6 (c) shows that summary information on each of the word file images is provided as the pinch-in touch gesture is continuing in the multi-view state. Each of the word file images 630a and 630b may be able to emphasize the summary information on the corresponding word file while the multi-view state continues. For instance, a content of a corresponding word file can be provided in summary to a user in a manner that a head line or title of the corresponding word file gradually appears in response to the pinch-in touch gesture.

Referring to FIG. 6 (d), as the pinch-in touch gesture is continuing in the multi-view state, it can be observed that a list view state is entered to display a list 640 of the word files. In particular, the continuation of the pinch-in touch gesture in the multi-view state enables the controller 180 to switch to the list view state.

In case that the $2^{nd}$ word file image 630b is selected in FIG. 6 (c), it may be able to display the $2^{nd}$ word file image 630b on the touchscreen 151 in the single view state shown in FIG. 6 (e). Moreover, it may be able to activate the word file related to the $2^{nd}$ word file image 630b via the word processor application.

According to the above description, in case that the pinch-in touch gesture continues in the multi-view state shown in FIG. 6 (b), the summary information display operation shown in FIG. 6 (c) or the list view state display operation shown in FIG. 6 (d) is performed. For another instance, in case that the pinch-in touch gesture continues in the multi-view state shown in FIG. 6 (b), the summary information display operation shown in FIG. 6 (c) may be performed. If the pinch-in touch gesture continues in FIG. 6 (c), it may be able to switch to the list view state shown in FIG. 6 (d).

Figure 7:
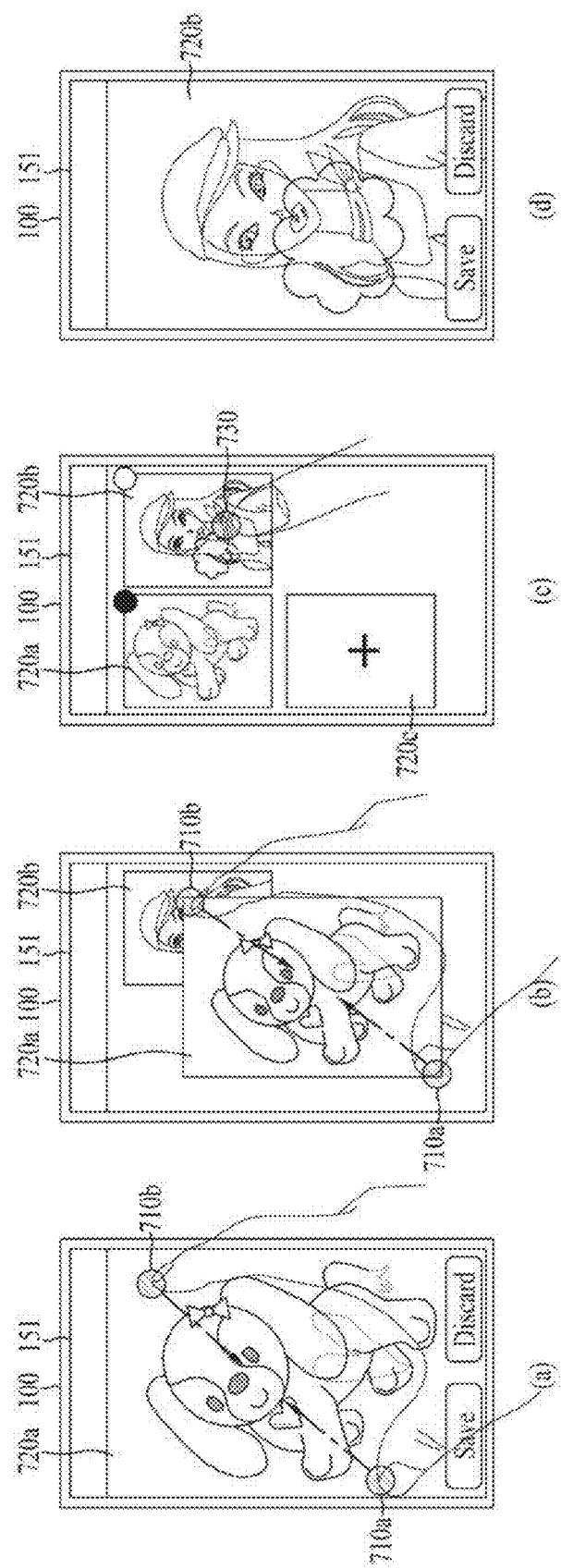
FIG. 7 is a diagram for one example of a multi-view state switching operation in association with an image editing application in response to a pinch-in touch gesture according to the present invention.

FIG. 7 is a diagram for one example of a multi-view state switching operation in association with an image editing application in response to a pinch-in touch gesture according to the present invention.

Referring to FIG. 7 (a), as an image editing application is activated, a specific image file may be edited. In doing so, the touchscreen 151 may display a $1^{st}$ image 720a related to the specific image n a single view state. In doing so, if a pinch-in touch gesture for decreasing a relative distance between two touch points 710a and 710b is performed, the controller 180 may switch the single view state to a multi-view state for displaying several images for the image editing application.

Referring to FIG. 7 (b), in response to the pinch-in touch gesture, a plurality of images 710a and 710b are displayed on the touchscreen 151. When the multi-view state is entered in response to the pinch-in touch gesture, the relative distance between the two touch points 710a and 710b decreases and a size of the $1^{st}$ image 710 decreases in proportion to the relative distance. In particular, if the relative distance between the two touch points 710a and 710b decreases in response to the pinch-in touch gesture, the $1^{st}$ image 710a displayed in the single view state on the touchscreen 151 shown in FIG. 7 (a) is correspondingly displayed in a manner that the size of the $1^{st}$ image 710a is decreased.

Referring to FIG. 7 (c), a plurality of images 720a and 720b are displayed in the multi-view state in response to the pinch-in touch gesture. A creation window for creating a new image or a $3^{rd}$ image 720c is displayed as well as the $1^{st}$ image 720a related to the image filed edited in FIG. 7 (a) and the $2^{nd}$ image 720b related to another image file.

In association with FIG. 7 (c), each of a plurality of the images 720a and 720b may be able to indicate whether its corresponding image file is saved. In the drawing, the $1^{st}$ image 720a may use an indication '•' to indicate that the related image file is saved. And, the $2^{nd}$ image 720 may use an indication 'o' to indicate that the related image file is not saved.

In FIG. 7 (c), shown is a touch gesture for selecting the $2^{nd}$ image 720b from a plurality of the images 720a and 720b displayed in the multi-view state. After a specific image has been selected in the multi-view state, the controller 180 switches the multi-view state to a single view state and may then control the selected image on a full screen.

Referring to FIG. 7 (d), the $2^{nd}$ image 720b selected in response to the selection action shown in FIG. 7C is displayed in the single view state on the touchscreen 151. In doing so, the $2^{nd}$ image 720b may be displayed in the previous state for editing the $2^{nd}$ image.

In association with FIG. 7, the exact state of the ongoing job in case of the initiation of the pinch-in touch gesture in the course of displaying an image in the single view state can be held as it is. And, an image file related to this image in the edited state can be exactly saved in the memory 160.

Figure 8:
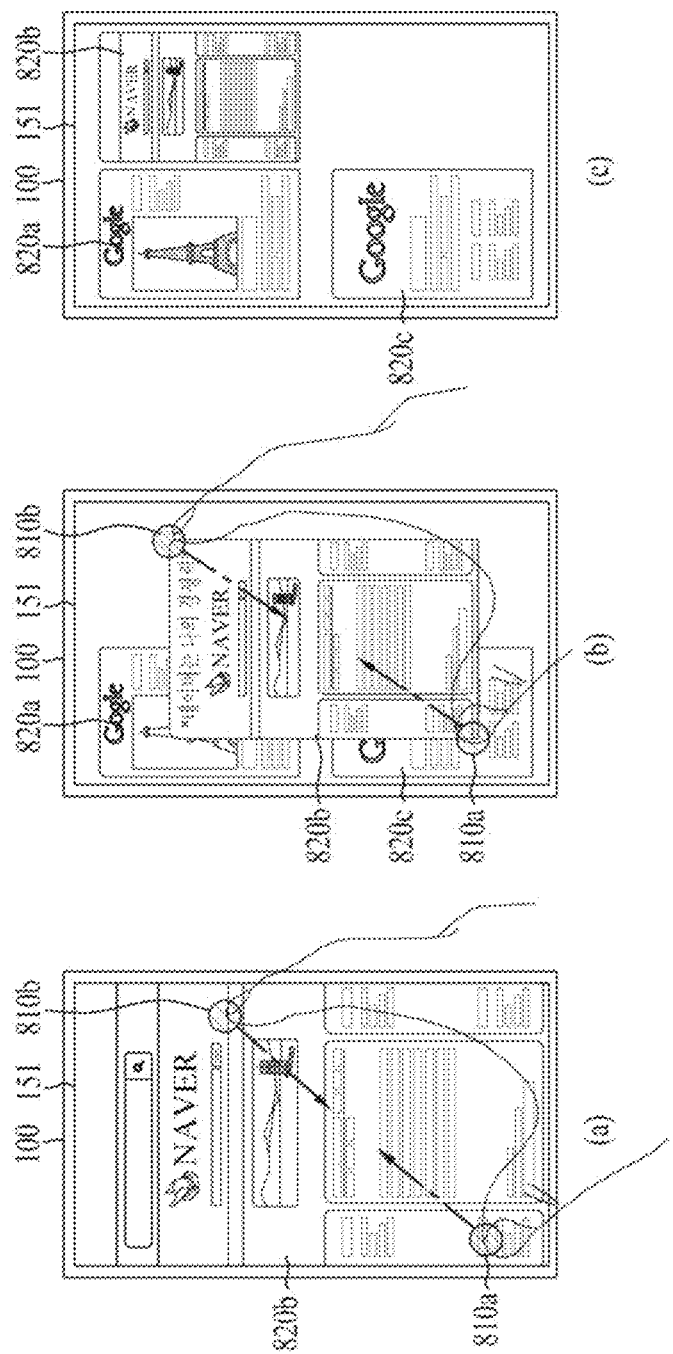
FIG. 8 is a diagram for one example of a multi-view state switching operation in association with an internet application in response to a pinch-in touch gesture according to the present invention.

FIG. 8 is a diagram for one example of a multi-view state switching operation in association with an internet application in response to a pinch-in touch gesture according to the present invention.

Referring to FIG. 8, after a specific site has been accessed by activating an internet application, if a pinch-in touch gesture is performed in the course of displaying an image of the corresponding site, other site images may be displayed. And, another site image may be displayed in response to a selection action or gesture.

Referring to FIG. 8 (a), after an internet application has been activated, a specific site is accessed. And, a $1^{st}$ site image 820b corresponding to the specific site is displayed in a single view state on the touchscreen 151. In doing so, a pinch-in touch gesture may be performed to decrease a relative distance between two touch points 810a and 810b. While the specific site image 820b is displayed via the internet application, if such a pinch-in touch gesture as shown in the drawing is received, the controller 180 may switch to a multi-view state and may display other site images.

Referring to FIG. 8 (b), a plurality of site images 820a to 820c may be displayed in the multi-view state on the touchscreen 151. And, the site image 820a and 820c related to other sites previously activated via the internet application may be displayed as well as the $1^{st}$ site image related to the activated site.

In response to a pinch-in touch gesture, the touchscreen 151 may display the $1^{st}$ site image 820b in a manner of decreasing a size of the $1^{st}$ site image 820b. In dong so, the size of the $1^{st}$ site image 820b may be determined in a manner of depending on positions of two touch points 810a and 810b according to the pinch-in touch gesture.

Meanwhile, the reduced $1^{st}$ site image 820b may represent summary information on the corresponding site on its front surface in response to the pinch-in touch gesture. In particular, as soon as the pinch-in touch gesture is performed on the $1^{st}$ site image 820b, the information on the corresponding site, i.e., the summary information on the $1^{st}$ site image 820b (e.g., 'Naver is my competitive power') may be briefly represented by the $1^{st}$ site image 820b.

Referring to FIG. 8 (c), in response to the ongoing pinch-in touch gesture in the state shown in FIG. 8 (b), a plurality of the image sites 820a to 820c are displayed in equal size in the multi-view state. As mentioned in the foregoing descriptions with reference to FIGS. 5 to 7, if another site image is selected in the multi-view state shown in FIG. 8 (c), the multi-view state can be switched to the single view state and the selected site image can be displayed on the touchscreen 151.

In the following description, an operation of changing a hierarchical structure of images (e.g., icons, file images, etc.) displayed on the touchscreen 151 by a different control operation in response to a pinch-in/out touch gesture is explained with reference to FIG. 9 and FIG. 10.

First of all, it may be able to adjust sizes of a plurality of images displayed on the touchscreen 151 in response to a pinch-in/out touch gesture. In doing so, if the pinch-in/out touch gesture exceeds a predetermined level, it may be able to display an image of a step above or below the predetermined level. For instance, while a plurality of file images are displayed on the touchscreen 151, assume a case that a pinch-in touch gesture for reducing an image is received. It may be able to decrease sizes of displayed file images within a prescribed range. If a pinch-in touch gesture continues over a specific level, it may be able to display a higher level image of the file images, e.g., a directory image. On the contrary, in case of a pinch out touch gesture, it may be able to display a lower layer image.

FIG. 9 is a diagram for an operation of changing a hierarchical structure of images displayed in response to user's continuous pinch-in touch gesture on a home screen image according to the present invention.

Referring to FIG. 9 (a), a single file image 910a is displayed on the touchscreen 151. In the drawing, while the file image 910a is displayed, a user performs a pinch-in touch gesture on the touchscreen 151 to decrease a relative distance between two touch points 905a and 905b.

In case that a pinch-in touch gesture is performed on a whole region of the touchscreen 151, an image displayed on the touchscreen 151 may be displayed in a manner of being entirely reduced. In particular, the controller 180 recognizes that the relative distance between the two touch points 905a and 905b is decreased in response to the pinch-in touch gesture and may be then able to reduce the image displayed on the touchscreen 151.

Referring to FIG. 9 (b), the whole image is reduced in response to the pinch-in touch gesture shown in FIG. 9 (a). Although FIG. 9 (a) shows that the single file image 910a is displayed on the touchscreen 151 only, the touchscreen 151 may be able to display a plurality of images 910a to 910i in response to a user's pinch-in touch gesture.

Referring to FIG. 9 (b), the pinch-in touch gesture for decreasing the relative distance between the two touch points 905a and 905b keeps being performed on the touchscreen 151.

Referring to FIG. 9 (c), the touchscreen 151 displays a control operation of a next level in response to the pinch-in touch gesture. Although a plurality of the file images 910a to 910i are displayed on the touchscreen 151 shown in FIG. 9 (b), it may be able to change a hierarchical structure of the images displayed in response to a user's pinch-in touch gesture. In particular, the touchscreen 151 may be able to display a directory image 920a including a plurality of the file images 910a to 910i. In more particular, the file image display step of the lower layer step for displaying the file images 910a to 910i may be switched to the directory image display step of a middle layer step for displaying the directory images 920a to 920d in response to the pinch-in touch gesture.

Meanwhile, a timing point of changing a layer may be determined by a user or may be determined in advance by a manufacturer. Instead of increasingly reducing or enlarging sizes of images in response to a pinch-in touch gesture or a pinch-out touch gesture, once a specific interval is entered, it may be able to change a layer of images. And, the specific interval or timing point may be determined in advance.

Referring to FIG. 9 (c), another pinch-in touch gesture is performed on the touchscreen 151 again to decrease the relative distance between the two touch points 910a and 910b.

Referring to FIG. 9 (d), the touchscreen 151 displays a next layer step in response to the pinch-in touch gesture shown in FIG. 9 (c). In case that the pinch-in touch gesture keeps being performed in FIG. 9 (c), the directory image 920a may be reduced. If the pinch-in touch gesture further keeps being performed, an application icon image 930a may be displayed as shown in FIG. 9 (d). In particular, in the middle layer step, the directory images 920a to 920d are displayed. If the pinch-in touch gesture continues, the middle layer step may be switched to a higher layer step, i.e., an application icon display step of displaying application icons 930a to 930d.

For clarity of the following description, the directory images 920a to 920d may be explained as the images related to directory files executed in the word application related to the word application icon image 930a.

In summary of the control operation shown in FIG. 9 (a) to FIG. 9 (d), in response to a user's continuous pinch-in touch gesture, an image on the touchscreen 151 is reduced and displayed, initially displayed file images are switched to directory images corresponding to upper layers of the file images, the upper layers of the file images are displayed, the directory images are switched to application icon images corresponding to higher layers of the directory images, and the application icon images are then displayed.

The operation of changing the hierarchical structure, as shown in FIG. 9 (a) to FIG. 9 (d), is applied in association with a photo image is described as follows.

First of all, if a pinch-in touch gesture is performed in a detail view state for displaying a single photo image on the touchscreen 151, the single photo image may be displayed in a manner of being reduced in size. If the pinch-in touch gesture keeps being performed in this state, the detail view state may be switched to a thumbnail view state in which a plurality of photo images are displayed as thumbnail images on the touchscreen 151. Subsequently, if the pinch-in touch gesture keeps being performed in this state, the thumbnail images may be displayed in the thumbnail view state in a manner that the thumbnail images are reduced in size and that the number of the thumbnail images increases. In particular, if the number of thumbnail images displayed in an initial thumbnail view state is 3*5, the number of thumbnail images may increase to 4*7 in response to the pinch-in touch gesture and may further increase to 5*9. If the pinch-in touch gesture keeps being performed in the thumbnail view state, the thumbnail view state may be switched to an album view state. Thus, if a pinch-in touch gesture is applied to a photo image, a size of an image may be decreased in response to the pinch-in touch gesture, a detail view state may be switched to a thumbnail view state, and the thumbnail view state may be switched to an album view state. On the contrary, if a pinch-out touch gesture is applied to a photo image, a size of an image may be increased in response to the pinch-out touch gesture, an album view state may be switched to a thumbnail view state, and the thumbnail view state may be switched to a detail view state.

In the drawings, referring to FIG. 9 (e) and FIG. 9 (f), in case that the pinch-in touch gesture keeps being performed on the touchscreen 151, a display region on the touchscreen 151 is reduced and the touchscreen 151 eventually enters a touch lock state.

Referring to FIG. 9 (e), as the ongoing pinch-in touch gesture shown in FIG. 9 (d) continues, a control operation is performed to have a display region of the touchscreen 515 limited to a specific region 940. In particular, all images displayed on the touchscreen 151 are displayed in a manner of being reduced.

Referring to FIG. 9 (f), in response to the continuous pinch-in touch gesture, the touchscreen 151 enters a touch lock state.

Regarding the changes of the display operations shown in FIGS. 9 (a) to 9 (f), the changes may be performed continuously. In particular, as the pinch-in touch gesture continues, icons may be reduced in size with continuity as well. Moreover, a switching to a directory image from a file image and a switching to an application icon image from the directory image may be consecutively changed.

Although the pinch-in touch gesture for decreasing the relative distance between the two touch points 905a and 905b is described with reference to FIGS. 9 (a) to 9 (e), the description with reference to FIGS. 9 (a) to 9 (e) may be applicable to a pinch-out touch gesture for increasing the relative distance between the two touch points 905a and 905b. In general, in case of the pinch-out touch gesture, a function opposite to that of the pinch-in touch gesture may be performed.

In particular, in case that a pinch-out touch gesture is performed in the touchscreen lock state shown in FIG. 9 (f), a touchscreen unlock state shown in FIG. 9 (e) may be entered. If the pinch-out touch gesture continues in the state shown in FIG. 9 (e), the state shown in FIG. 9 (e) may be changed into the state shown in FIG. 9 (d) in a manner that an image region 940 is enlarged. If the pinch-out touch gesture still continues in the state shown in FIG. 9 (d) (i.e., higher layer step), the state shown in FIG. 9 (d) may be switched to the directory image display (i.e., middle layer step) shown in FIG. 9 (c).

If the layer structure is changed like the state shown in FIG. 9 (d) is changed into the state shown in FIG. 9 (c), a reference for determining a layer structure to be changed for a prescribed application icon image may be required. For instance, since a plurality of application icon images 930a to 930d are displayed in FIG. 9 (d), it may be necessary to determine a middle layer step for a prescribed application icon image in case of performing a pinch-out touch gesture. Hence, the controller 180 selects an application icon image displayed in a largest size on the touchscreen 180 and may be then able to switch to the middle layer step of the selected application icon image. Alternatively, a user directly selects a prescribed application icon image from a plurality of application icon images and may enable a middle layer step of the selected prescribed application icon image to be entered. This principle may be identically applicable to a case of switching directory images to file images.

Thus, if the pinch-out touch gesture keeps being performed, the states may be changed in order of FIG. 9 (f), FIG. 9 (e), FIG. 9 (d), FIG. 9 (c), FIG. 9 (b) and FIG. 9 (a), which is reverse to that of the pinch-in touch gesture.

FIG. 10 is a diagram for an operation of changing a hierarchical structure of a display image in response to user's continuous pinch-in touch gesture on a calendar display screen according to the present invention.

Referring to FIG. 10, through a pinch-in/out touch gesture, icons or images may be enlarged/reduced and each display step may be switched to a higher step or a lower step. For instance, considering a calendar display screen, when the touchscreen 151 displays a day state, if a pinch-in touch gesture is performed, the day state may be switched to a week state. Moreover, when the touchscreen 151 displays the week state, if a pinch-out touch gesture is performed, the week state may be switched to the day state.

Referring to FIG. 10 (a), as a calendar application is activated, a calendar display screen is displayed. In particular, the touchscreen 151 displays a day state image 1010 for a day in the calendar display screen. In doing so, if a pinch-in touch gesture for decreasing a relative distance between two touch points 1015*a* and 1015*b* is performed, the day state image 101 may be switched to a week state image 1020.

Referring to FIG. 10 (*b*), the day state image 1010 is reduced and the week state image 1020 is displayed. In doing so, if the pinch-in touch gesture keeps being performed, the day state image may be completely switched to the week state image 1020 for displaying the week state only, as shown in FIG. 10 (*c*). In case that the day state image 1010 is still displayed, as shown in FIG. 10 (*b*), information 'D14' indicating what date is the corresponding day may be displayed.

Referring to FIG. 10 (*c*), if the pinch-in touch gesture for decreasing the relative distance between the two touch points 1015*a* and 1015*b* in the displayed week state image 1020 is performed, the week state image 1020 may be switched to a month state image 1030.

Referring to FIG. 10 (*d*), in response to the pinch-in touch gesture, the week state image 1020 keeps being reduced and the touchscreen 151 displays the month state image. In doing so, if the pinch-in touch gesture continues, referring to FIG. 10 (*e*), the week state image 1020 disappears and the month state image 1030 is displayed. In doing so, the initial day state image 1010 may be highlighted and displayed in the month state image 1030.

Meanwhile, regarding the calendar application, the above description is made just on the assumption of the pinch-in touch gesture. Yet, the same description may apply to a pinch-out touch gesture. For instance, in response to the pinch-out touch gesture, a year state image may be switched to a month state image, the month state image may be switched to a week state image, and the week state image may be switched to a day state image.

In the following description, for another example of a control operation by a pinch-in/out touch gesture, an operation of changing information indicated by an icon displayed on a home screen and an operation of activating an application corresponding to an icon are explained with reference to FIG. 11 and FIG. 12.

FIG. 11 is a diagram for one example of an operation of changing information indicated by an icon displayed in a home screen image in response to a pinch-out touch gesture according to the present invention.

According to the present invention, a home screen image or information indicated by an icon may be changed using a pinch-out touch gesture. For instance, in case that a pinch-out touch gesture keeps being performed, a size of an icon displayed in a home screen image is increased and information indicated by a specific icon may be modified in response to the pinch-out touch gesture.

In particular, in case that a relative distance between two touch points is increased in response to a pinch-out touch gesture, an icon displayed in a home screen image may be displayed in a manner that a size of the icon is increased. In accordance with a progress level of the pinch-out touch gesture, an information on an application related to a specific icon is modified, the modified information may be represented by the specific icon, and the application related to the specific icon may be activated.

For instance, in accordance with a progress extent of a pinch-out touch gesture, a $1^{st}$ step may be set to increase a size of a specific icon only in response to the pinch-out touch gesture. In a $2^{nd}$ step next to the $1^{st}$ step, an actual active state information of an application indicated by a specific icon may be displayed as well as a size of the specific icon is increased. In a $3^{rd}$ step, if a size of an icon is increased over a predetermined level, an application indicated by the corresponding icon is actually activated and the touchscreen 151 may be set to display an active application image in a single view state.

Referring to FIG. 11 (*a*), a home screen image of the mobile terminal 100 is displayed on the touchscreen 151. In doing so, the home screen image may be displayed on the touchscreen 151 in a manner of including a plurality of icons 1110*a* to 1110*e*. Subsequently, a pinch-out touch gesture is performed in a manner of touching two specific points 1120*a* and 1120*b* of a specific icon 1110*a* among a plurality of the icons 1110*a* to 1110*e* and then increasing a relative distance between the touched two specific points 1120*a* and 1120*b*. In FIG. 11, the specific icon 1110*a*, which is a touch target of the pinch-out touch gesture, is the icon related to a message application.

Referring to FIG. 11 (*b*), as the pinch-out touch gesture is performed on the specific icon 1110*a*, the selected specific icon 1110*a* is displayed in a manner that its size is increased. In particular, if the relative distance between the two touch points 1120*a* and 1120*b* is increased in response to the pinch-out touch gesture, the selected specific icon 1110*a* is displayed in a manner that its size is increased. In doing so, sizes of the rest of the icons 1110*b* to 1110*e* may be increased as well as the size of the specific icon 1110*a*. Yet, the size of the specific icon 1110*a*, which is the target of the pinch-out touch gesture, is optionally increased only, while the sizes of the rest of the icons 1110*b* to 1110*e* remain intact.

The specific icon 1110*a* shown in FIG. 11 (*b*) differs from the former specific icon 1110*a* shown in FIG. 11 (*a*). In particular, the former specific icon 1110*a* shown in FIG. 11 (*a*) represents simple information indicating that the number of received messages is 3 in the message application, but the latter specific icon 1110*a* shown in FIG. 11 (*b*) may actually represent a content of one of the received messages. In particular, the information represented via the specific icon 1110*a* may be changeable as well as the display size of the specific icon 1110*a* is increased.

Referring to FIG. 11 (*c*), if the pinch-out touch gesture continues, the specific icon 1110*a* represents a changed information. In particular, a content of another received message of the message application related to the specific icon 1110*a* can be represented by the specific icon 1110*a* as well as the size of the specific icon 1110*a* is increased.

Referring to FIG. 11 (*d*), if the pinch-out touch gesture further continues, the message application indicated by the specific icon 1110*a* may be actually activated. And, an active screen image of the message application may be displayed on a full screen of the touchscreen 151 in a single view state. Hence, it may be able to display an active operation of the message application on the full screen of the touchscreen 151. In doing so, a reference for actually activating the message application in response to the pinch-out touch gesture may be variously set to one of a case that the size of the icon 1110*a* displayed on the touchscreen is equal to or greater than a predetermined level, a case that a relative distance between two touch points of the pinch-out touch gesture is equal to or greater than a predetermined level, and the like.

Referring to FIG. 11 (*e*), after the message application has been activated, an initialized state is shown. In comparison with FIG. 11 (*a*), FIG. 11 (*e*) shows a state that the indication of the received messages has disappeared from the specific icon 1110*a* as several messages of the message application has been checked in response to the pinch-out touch gesture.

Meanwhile, when a pinch-out touch gesture is performed, a different control operation may be performed in association with whether a user releases his fingers from the touchscreen 151. For instance, after a pinch-out touch gesture has been initiated, if the user keeps touching the touchscreen 151, the icon display state shown in one of FIGS. 11 (a) to 11 (c) may be displayed on the touchscreen 151. Yet, if the user releases his fingers from the touchscreen after the initiation of the pinch-out touch gesture, the application activated state may be displayed on the touchscreen 151, as shown in FIG. 11 (d).

FIG. 12 is a diagram for another example of an operation of changing information displayed on an icon displayed on a home screen image in response to a pinch-out touch gesture according to the present invention.

With reference to FIG. 11, an operation of changing an information represented by a single icon 110a in response to a pinch-out touch gesture is described. Yet, with reference to FIG. 12, an operation of changing an information represented by each of several icons by increasing sizes of the several icons simultaneously in response to a pinch-out touch gesture shall be described as follows.

Referring to FIG. 12 (a), a plurality of icons 1210a to 1210d and the like configuring a home screen are displayed on the touchscreen 151. And, a pinch-out touch gesture for increasing a relative distance between two touch points 1210a and 1210b corresponding to a specific region is shown in the drawing. Comparing FIG. 12 with FIG. 11, the pinch-out touch gesture shown in FIG. 11 (a) is the touch gesture performed on the two touch points 1120a and 1120b of the specific icon 110a, while the pinch-out touch gesture shown in FIG. 12 (a) is the touch gesture performed on the two touch points 1210a and 1210b of a random specific region on the touchscreen 151 rather than the specific icon 1220a.

Referring to FIG. 12 (b), a plurality of the icons 1210a to 1210d are displayed in a manner that sizes of a plurality of the icons 1210a to 1210d are increased in response to the pinch-out touch gesture performed on the specific region. Moreover, applications respectively related to a plurality of the icons 1210a to 1210d may be activated and each of a plurality of the icons 1210a to 1210d may be able to represent an information on each of the applications. For instance, the $1^{st}$ icon 1220a relates to a message application, the $2^{nd}$ icon 1220b relates to a document application, the $3^{rd}$ icon 1220c relates to an internet application, and the $4^{th}$ icon 1220d relates to a call application. Hence, as the relative distance between the two touch points is increased in response to the pinch-out touch gesture, each of the icons may represent the corresponding application information as soon as sizes of the icons are increased.

In the drawing, the $1^{st}$ icon 1220a may represent the information on an active state of the message application and the $3^{rd}$ icon 1220c may represent the information on an active state of the internet application. In particular, recent state information on the application represented by each of the icons in response to the pinch-out touch gesture may be schematically checked.

In FIG. 12 (b), a user may be able to change the information indicated by each of the icons. The active state information on a specific icon may be changeable, as shown in the drawing, while a plurality of the icons represent active state information on a plurality of applications, respectively. For instance, when the $1^{st}$ icon 1220a is selected and touch-scrolled, other message contents of a text message application may be checked. In doing so, the unselected $3^{rd}$ icon 1220c may be maintained as it is.

Moreover, in case of attempting to check a state of each application in further detail, it may be able to directly activate the corresponding application by selecting each icon.

Referring to FIG. 12 (c), a user performs an action to select the $1^{st}$ icon 1220a from a plurality of the icons 1220a to 1220d. Referring to FIG. 12 (d), as the $1^{st}$ icon 1220a is selected, an active image 1240 of a message application related to the $1^{st}$ icon 1220a may be displayed on a full screen of the touchscreen 151 in a single view state.

Figure 13:
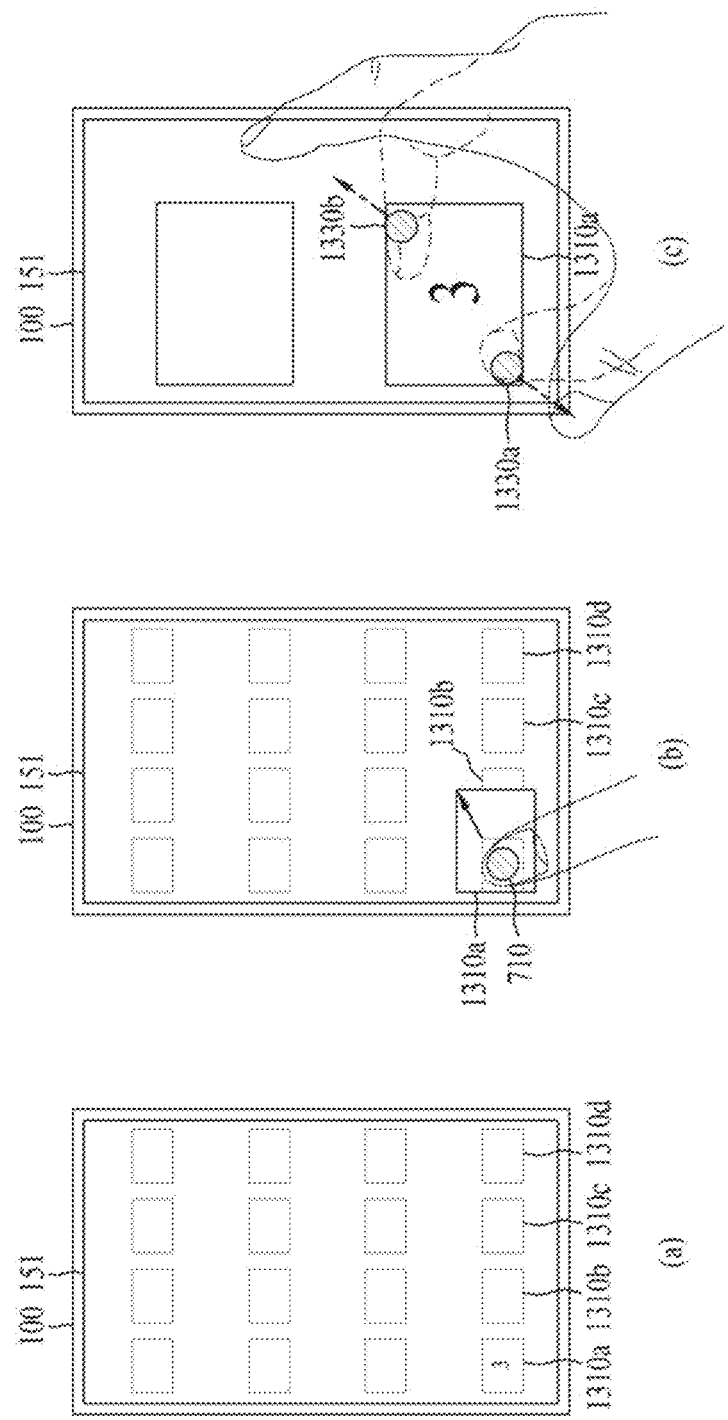
FIG. 13 is a diagram for an operation of enlarging an icon temporarily in association with an initiation of a pinch-in/out touch gesture according to the present invention.

FIG. 13 is a diagram for an operation of enlarging an icon temporarily in association with an initiation of a pinch-in/out touch gesture according to the present invention.

According to the present invention, in case of attempting to enlarge or reduce an icon by a pinch-in/out touch gesture, a target (e.g. an icon, an image, etc.) to be enlarged or reduced may have a size too small to select two touch points. Hence, the present invention temporarily increases a size of the icon to enlarge or reduce prior to the pinch-in/out touch gesture, more particularly, the pinch-out touch gesture, thereby facilitating a user to touch the corresponding icon.

Referring to FIG. 13, a plurality of icons 1310a to 1310d are displayed on the touchscreen 151.

Referring to FIG. 13 (b), if a specific icon 1310a among the icons 1310a to 1310d is slightly touched, a size of the touched icon 1310a may be increased. Hence, a user performs a pinch-out touch gesture by multi-touching two points belonging to the enlarged icon 1310a, thereby further enlarging the corresponding icon.

Referring to FIG. 13 (c), the size of the specific icon 1310a is increased in response to the pinch-out touch gesture.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Accordingly, embodiments of the present invention provide various effects and/or features.

First of all, a mobile terminal according to the present invention switches an active application file into another application file using a user-friendly pinch-in/out touch gesture.

Secondly, a mobile terminal according to the present invention facilitates a specific application to be quickly activated using a pinch-in/out touch gesture performed on a touchscreen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
    executing a specific application;
    displaying a first file image associated with the specific application on a touchscreen of the mobile terminal, the first file image being displayed in a single view state of which a single file image is displayed on the touchscreen;

receiving a pinch-in touch gesture input on the first file image via the touchscreen while the first file image is displayed in the single view state, a displayed size of the first file image reduced progressively according to a decreasing distance between touch points on the touchscreen of the pinch-in touch gesture input;

displaying at least a second file image associated with the specific application at a same position on the touch screen while the displayed size of the first file image is reduced progressively to a displayed size of the second file image, the displayed size of the second file image being consistent while the pinch-in touch gesture input is received;

displaying a plurality of file images in a multi-view state in response to the pinch-in touch gesture input, wherein the plurality of file images comprise the first file image and the second file image that are displayed in a same size, not overlapping one another, wherein all of the plurality of file images are associated with the specific application being executed;

displaying a content creation icon in the multi-view state for executing an application to create a new content item, wherein the new content item is associated with the specific application being executed;

receiving a first touch input or a second touch input on the second file image in the multi-view state, wherein the first touch input and the second touch input are different types of touch inputs;

displaying the second file image in the single view state without progressively increasing the displayed size of the second file image, such that the plurality of file images other than the second file image are no longer displayed, in response to the first touch input;

increasing the displayed size of the second file image to a first size in response to the second touch input, wherein the second file image of the first size is smaller than the second file image displayed in the single view state;

receiving a pinch-out touch gesture input with respect to the second file image displayed in the first size;

further increasing the displayed size of the second file image progressively from the first size to a second size according to an increasing distance between touch points on the touchscreen of the pinch-out touch gesture input, a displayed size of the first file image being consistent while the pinch-out touch gesture input is received, wherein the second file image of the second size is smaller than the second file image displayed in the single view state; and displaying the second file image in the single view state in response to the pinch-out touch gesture input that is received continuously after the displayed size of the second file image has been increased to the second size such that the second file image is displayed in the single view state when the pinch-out touch gesture has been received for more than a threshold time period or when the increasing distance between the touch points is greater than a threshold distance, wherein the threshold time period or the threshold distance is determined by a user or in advance by a manufacturer of the mobile terminal, wherein the first file image corresponds to an image representation of a first application file and the second file image corresponds to an image representation of a second application file, the method further comprising switching from the multi-view state to a text-only list view state in which a first textual representation of the first application file and a second textual representation of the second application file are listed in a text-only file list without the first file image and the second file image when the pinch-in touch gesture input is continued after switching to the multi-view state.

2. The method of claim 1, wherein the pinch-in touch gesture input comprises touching at least two points on the touchscreen and then dragging from the at least two points such that a distance between the touched at least two points decreases.

3. The method of claim 1, wherein the first file image is displayed distinguishably from others among the plurality of file images in the multi-view state.

4. The method of claim 1, wherein:
the second file image is displayed at a fixed position on the touchscreen while the displayed size of the first file image is reduced progressively;
the first file image overlaps the second file image at least momentarily when the displayed size of the first file image is reduced while the pinch-in touch gesture input is received; and
the reduced size of the first file image is larger than the displayed size of the second file image when the first file image overlaps the second file image.

5. The method of claim 1, further comprising:
displaying information indicating that the first file image is being executed by the specific application in the single view state;
continuously displaying the information after switching from the single view state to the multi-view state until the second file image is selected; and
switching to the single view state in response to a user input for selecting the second file image and then displaying information indicating that the second file image is being executed by the specific application in the single view state.

6. The method of claim 1, wherein the specific application comprises a music application, an Internet application, a word processor application, or an image application.

7. The method of claim 6, wherein:
each of the first application file and the second application file comprises a music file activated by the music application when the specific application comprises the music application; and
the first file image comprises a first album image associated with the first application file and the second file image comprises a second album image associated with the second application file.

8. The method of claim 6, wherein:
each of the first file image and the second file image includes information indicating whether a corresponding application file has been saved when the specific application comprises the word processor application or the image application.

9. The method of claim 1, further comprising:
ending the specific application when the pinch-in touch gesture input is continued in the multi-view state.

10. The method of claim 1, further comprising:
displaying summary information regarding the first application file and summary information regarding the second application file in the text-only list view state.

11. The method of claim 1, further comprising storing an execution status of the first application file being executed by the specific application when switched to the multi-view state.

12. A mobile terminal comprising:
a touchscreen; and a controller configured to execute a specific application and cause the touchscreen to:
  display a first file image associated with the specific application in a single view state of which a single file image is displayed;
  reduce a displayed size of the first file image progressively according to a decreasing distance between touch points on the touchscreen of a pinch-in touch gesture input that is received while the first file image is displayed in the single view state;
  display at least a second file image associated with the specific application at a same position on the touch screen while the displayed size of the first file image is reduced progressively to a displayed size of the second file image, the displayed size of the second file image being consistent while the pinch-in touch gesture input is received;
  display a plurality of file images in a multi-view state in response to the pinch-in touch gesture input, wherein the plurality of file images comprise the first file image and the second file image that are displayed in a same size, not overlapping one another, wherein all of the plurality of file images are associated with the specific application being executed;
  display a content creation icon in the multi-view state for executing an application to create a new content item, wherein the new content item is associated with the specific application being executed;
  display the second file image in the single view state without progressively increasing the displayed size of the second file image, such that the plurality of file images other than the second file image are no longer displayed, in response to a first touch input received on the second file image in the multi-view state;
  increase the displayed size of the second file image to a first size in response to a second touch input that is received on the second file image in the multi-view state, wherein the second file image of the first size is smaller than the second file image displayed in the single view state;
  further increase the displayed size of the second file image progressively from the first size to a second size according to an increasing distance between two touch points on the touchscreen of a pinch-out touch gesture input that is received with respect to the second file image displayed in the first size, a displayed size of the first file image being consistent while the pinch-out touch gesture input is received, wherein the second file image of the second size is smaller than the second file image displayed in the single view state; and
  display the second file image in the single view state in response to the received pinch-out touch gesture input that is received continuously after the displayed size of the second file image has been increased to the second size such that the second file image is displayed in the single view state when the pinch-out touch gesture has been received for more than a threshold time period or when the increasing distance between the touch points is greater than a threshold distance,
  wherein the threshold time period or the threshold distance is determined by a user or in advance by a manufacturer of the mobile terminal,
  wherein the first file image corresponds to an image representation of a first application file and the second file image corresponds to an image representation of a second application file, and the controller is further configured to cause the touchscreen to switch from displaying the multi-view state to displaying a text-only list view state in which a first textual representation of the first application file and a second textual representation of the second application file are listed in a text-only file list without the first file image and the second file image when another pinch-in touch gesture input is received after switching to the multi-view state.

13. The mobile terminal of claim 12, wherein the pinch-in touch gesture input comprises touching at least two points on the touchscreen and then dragging from the at least two points such that a distance between the touched at least two points decreases.

14. The mobile terminal of claim 12, wherein the first file image is displayed distinguishably from others among the plurality of file images in the multi-view state.

15. The mobile terminal of claim 12, wherein the controller is further configured to cause the touchscreen to:
  display information indicating that the first file image is being executed by the specific application in the single view state;
  continue displaying the information after switching from the single view state to the multi-view state until the second file image is selected; and
  switch to the single view state in response to a user input for selecting the second file image and then cause the touchscreen to display information indicating that the second file image is being executed by the specific application in the single view state.

16. The mobile terminal of claim 12, wherein:
  the second file image is displayed at a fixed position on the touchscreen while the displayed size of the first file image is reduced progressively;
  the first file image overlaps the second file image at least momentarily when the displayed size of the first file image is reduced while the pinch-in touch gesture input is received; and
  the reduced size of the first file image is larger than the displayed size of the second file image when the first file image overlaps the second file image.

17. The mobile terminal of claim 12, wherein the specific application comprises a music application, an Internet application, a word processor application, or an image application.

18. The mobile terminal of claim 17, wherein:
  each of the first application file and the second application file comprises a music file activated by the music application when the specific application comprises the music application; and
  the first file image comprises a first album image associated with the first application file and the second file image comprises a second album image associated with the second application file.

19. The mobile terminal of claim 17, wherein:
  each of the first file image and the second file image includes information indicating whether a corresponding application file has been saved when the specific application comprises the word processor application or the image application.

20. The mobile terminal of claim 12, wherein the controller is further configured to end the specific application when the pinch-in touch gesture input is continued in the multi-view state.

21. The mobile terminal of claim 12, wherein the controller is further configured to cause the touchscreen to display summary information for the first application file and summary information for the second application file in the text-only list view state.

22. The mobile terminal of claim 12, further comprising a memory,
wherein:
the controller is further configured to cause the memory to store an execution status of the first application file being executed by the specific application when switched to the multi-view state.

23. The method of claim 3, wherein the first file image is displayed with a highlighted or shaded effect.

24. The method of claim 1, further comprising switching from the multi-view state to the single view state in which the second file image is displayed in response to a second touch input with respect to the second file image received in the multi-view state.

25. The mobile terminal of claim 14, wherein the first file image is displayed with a highlighted or shaded effect.

26. The mobile terminal of claim 12, wherein the controller is further configured to switch from the multi-view state to the single view state in which the second file image is displayed in response to a second touch input with respect to the second file image received in the multi-view state.

27. The method of claim 1, wherein:
the first touch input is applied by one finger; and
the second touch input is applied by one finger.

28. The method of claim 1, wherein:
the pinch-out touch gesture input is applied by two fingers;
the second touch input is a touch applied to the second file image without a pinching gesture; and
the second touch input is not same as the pinch-out touch gesture input.

29. The method of claim 9, further comprising:
displaying a higher hierarchical level view after ending the specific application;
continuing to switch to displaying successively higher hierarchical level views when additional pinch-in touch gesture inputs are received; and
switching the mobile terminal to a locked state when a final pinch-in touch gesture input is received while a highest hierarchical level view is displayed.

30. The mobile terminal of claim 20, wherein the controller is further configured to:
cause the touchscreen to display a higher hierarchical level view after ending the specific application;
continue to cause the touchscreen to switch to displaying successively higher hierarchical level views when additional pinch-in touch gesture inputs are received; and
switch the mobile terminal to a locked state when a final pinch-in touch gesture input is received while a highest hierarchical level view is displayed.

* * * * *